US012566299B2

(12) United States Patent
Anderson

(10) Patent No.: US 12,566,299 B2
(45) Date of Patent: Mar. 3, 2026

(54) DETACHABLE CONNECTORS FOR HIGH FIBER COUNT APPLICATIONS

(71) Applicant: CORNING RESEARCH & DEVELOPMENT CORPORATION, Corning, NY (US)

(72) Inventor: Timothy Winston Anderson, Newton, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 255 days.

(21) Appl. No.: 18/449,137

(22) Filed: Aug. 14, 2023

(65) Prior Publication Data

US 2024/0077684 A1     Mar. 7, 2024

Related U.S. Application Data

(60) Provisional application No. 63/403,410, filed on Sep. 2, 2022.

(51) Int. Cl.
*G02B 6/38* (2006.01)

(52) U.S. Cl.
CPC ......... *G02B 6/3831* (2013.01); *G02B 6/3821* (2013.01); *G02B 6/3839* (2013.01); *G02B 6/3849* (2013.01); *G02B 6/3851* (2013.01); *G02B 6/3883* (2013.01)

(58) Field of Classification Search
CPC .... G02B 6/387; G02B 6/3861; G02B 6/3862; G02B 6/3877; G02B 6/3879; G02B 6/3869
See application file for complete search history.

(56) References Cited

U.S. PATENT DOCUMENTS

| | | | | |
|---|---|---|---|---|
| 4,998,924 A * | 3/1991 | Ranford | .............. | A61M 5/3271 604/110 |
| 7,517,157 B1 * | 4/2009 | McNiece | ............... | G02B 6/403 385/60 |
| 8,891,926 B2 | 11/2014 | Demeritt et al. | | |
| 11,312,657 B2 | 4/2022 | Schneider | | |
| 2003/0091297 A1 | 5/2003 | Hung et al. | | |
| 2006/0093300 A1 * | 5/2006 | Marrs | .................. | G02B 6/3869 385/134 |
| 2019/0064453 A1 * | 2/2019 | Kempeneers | ........ | H01R 13/516 |
| 2021/0255402 A1 * | 8/2021 | Sutherland | ........... | G02B 6/3851 |
| 2023/0024658 A1 | 1/2023 | Wu | | |
| 2023/0152529 A1 * | 5/2023 | Fortusini | ............... | G02B 6/387 385/78 |

FOREIGN PATENT DOCUMENTS

WO     2020/081439 A1     4/2020

\* cited by examiner

*Primary Examiner* — Eric Wong
(74) *Attorney, Agent, or Firm* — Kapil U. Banakar

(57) ABSTRACT

The present disclosure relates to a matched pair detachable connector for high fiber count applications where the configuration of the connector maintains optical fiber alignment and ferrule alignment during assembly of the connector.

21 Claims, 23 Drawing Sheets

125A

168

185

150

100

168

125B

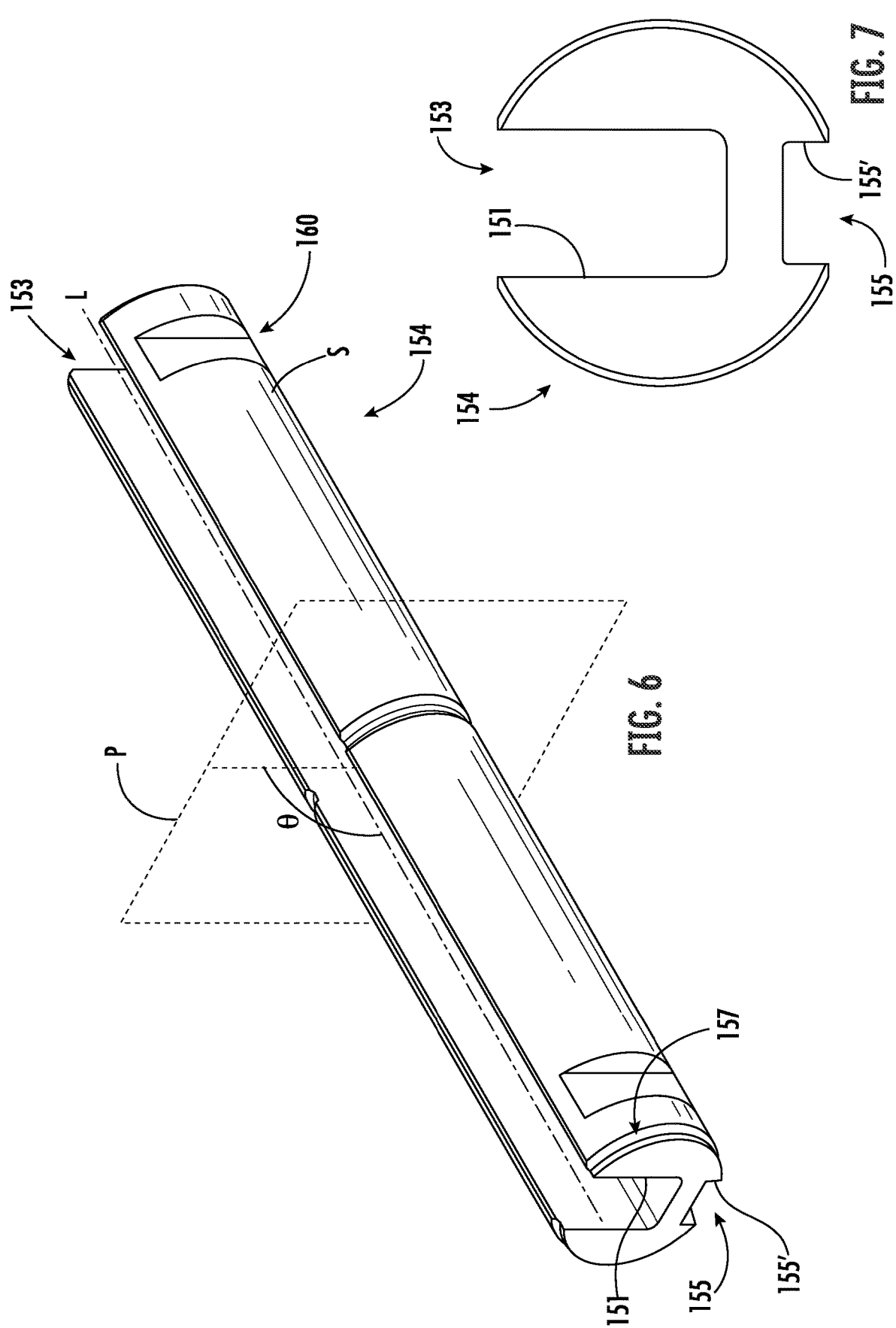

125
159
168D
154
168

160
154
158
168
181
125

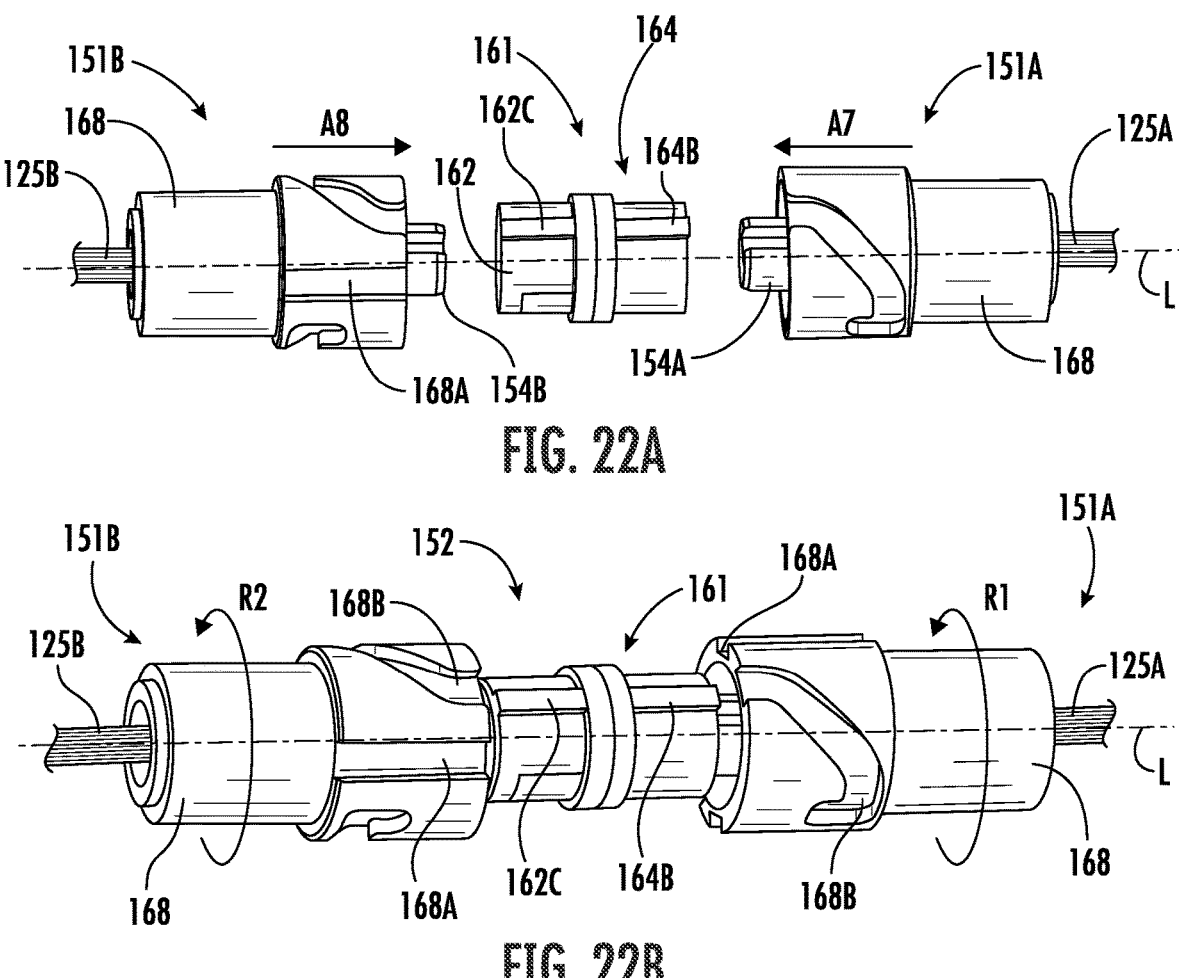
FIG. 22A
FIG. 22B
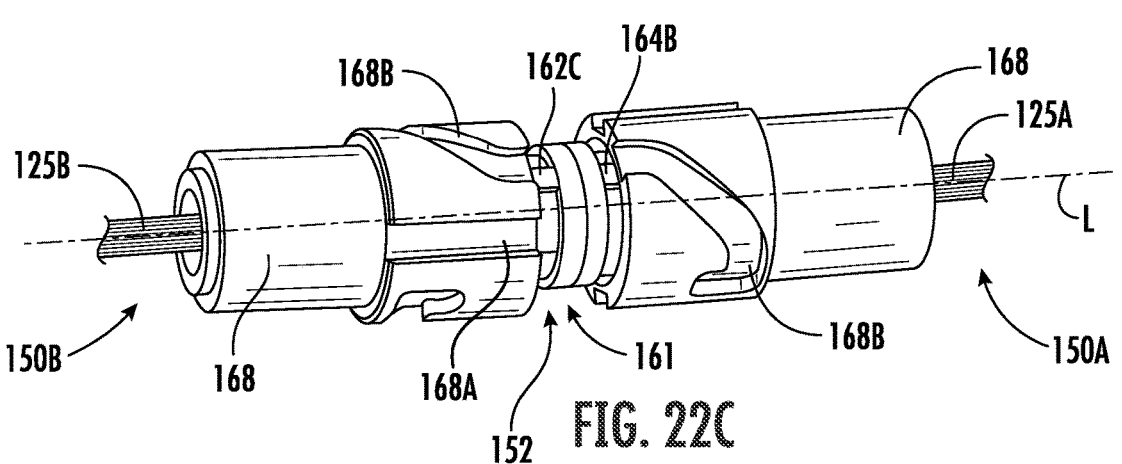
FIG. 22C

DETACHABLE CONNECTORS FOR HIGH FIBER COUNT APPLICATIONS

PRIORITY APPLICATION

This application claims the benefit of priority of U.S. Provisional Application No. 63/403,410, filed on Sep. 2, 2022, the content of which is relied upon and incorporated herein by reference in its entirety.

FIELD OF THE DISCLOSURE

This disclosure relates generally to optical fiber cable assemblies and systems, and more particularly, to high fiber count cable assemblies and systems and the corresponding manufacturing methods thereof.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

The rapid growth of hyperscale datacenters and 5G access networks have been driving the evolution of optical fiber cables toward increasing fiber count and density. Deployment of outside plant cables within datacenters has been a capital intensive infrastructure investment, and datacenter operators typically pre-install ducts to connect campus wide buildings. The ducts have various diameters ranging from 1 inch to 4 inches.

In conventional cable deployment, the cables are first installed through the ducts or micro-ducts. The cables are subsequently terminated in the field through fusion splicing inside a transition splice cabinet or a splice closure. Splicing in the field is a costly and time consuming process involving skilled field technicians. Field splicing also requires workspace that is sometimes unavailable.

Pre-terminated cables installed through the ducts are challenging since the connectors need to be packaged in a pulling grip that conforms to the cable diameter. The lack of high fiber count connectors coupled with the increase of fiber density exacerbates the problem. For example, a 6,912 fiber cable requires as many as 288 connectors if each connector terminates 24 fibers. An ideal connectivity between the furcated outside plant cable and the indoor cable would have a single or a small number of connections that only require a few matings over the lifetime. Commercially available highest fiber count single mode connectors are limited to 32 fibers. Moreover, the cost per fiber termination increases when moving to higher fiber count connectors due to the reduced yield in both connector and the assembly process.

With existing connector termination technology plateauing at about 32 fiber per connector, there is a need for alternative high fiber count termination process that enable the connections of more than 144 fibers in a small footprint, while providing at least the same level of insertion loss and cost per fiber termination.

SUMMARY OF THE DISCLOSURE

The present disclosure relates to a matched pair detachable connector for high fiber count applications where the configuration of the connector maintains optical fiber alignment and ferrule alignment during assembly of the connector.

In one embodiment, an optical fiber connector assembly is provided. The optical fiber connector assembly comprising: a plurality of optical fibers; a connector including: a ferrule having an inner channel in which the plurality of optical fibers are secured, the ferrule having at least one keyway on an outer surface of the ferrule and along at least a portion of a length of the ferrule; a key received in the at least one keyway, wherein the key engages with an inner wall of the at least one keyway to limit rotational movement of the connector assembly.

In another embodiment, the ferrule includes a groove and a sleeve spans at least the groove of the ferrule; and wherein the sleeve covers the inner channel of the ferrule. In another embodiment, the sleeve does not cover the keyway of the ferrule. In another embodiment, the keyway has an opening that is opposite of an opening of the inner channel of the ferrule. In another embodiment, the key comprises a U shaped key, wherein the U shaped key has a height H and a width W, wherein the height H is greater than the width W. In another embodiment, a ratio of height H to width W ranges between 0.5:1 and 4:1. In another embodiment, the key comprises a key body defined by at least a straight portion of the key, wherein the straight portion engages with edges of the keyway. In another embodiment, the key body includes an opening defined by the straight portion and an angled portion of the key. In another embodiment, the key body is further defined by an angled portion of the key, the key body further including a plurality of slots within the key body. In another embodiment, the plurality of slots comprises at least one slot spanning a portion of the straight portion and a portion of the angled portion of the key.

In one embodiment, an optical fiber connector assembly is provided. The optical fiber connector assembly comprising: a plurality of optical fibers; a connector including: a ferrule having an inner channel in which the plurality of optical fibers are secured, the ferrule having at least one keyway on an outer surface of the ferrule and along at least a portion of a length of the ferrule, the ferrule also having a groove; a key received in the at least one keyway, wherein the key engages with an inner wall of the at least one keyway to limit rotational movement of the connector assembly; and a sleeve applied onto the ferrule, wherein the sleeve covers at least the inner channel of the ferrule and spans the groove of the ferrule; and an adapter comprising: a cap including configured to house the sleeve; and a base coupled to the cap, the base configured to retain the key to be inserted into the keyway of the ferrule.

In another embodiment, the optical fiber connector assembly further comprising a first cam that houses a first spring and a second cam housing a second spring, wherein the first spring and the second spring are operably coupled to the ferrule such that the first spring and the second spring apply biasing forces onto the ferrule in opposite directions. In another embodiment, the optical fiber connector assembly further comprising a first spring push and a second spring push coupled to the ferrule, wherein the first spring push and the second spring push are positioned respectively between the first spring and the ferrule and the second spring and the ferrule, and wherein the first spring push and the second spring push are configured to receive and transfer the respective biasing forces applied by the first spring and the second spring onto the ferrule. In another embodiment, the optical fiber connector assembly further comprising a nut coupled to the cam, wherein the cam includes a cam slot and the nut includes corresponding cam pins configured to be received into the nut slot. In another embodiment, the optical fiber connector assembly further comprising a nut coupled to the cam, wherein at least a portion of the cam and at least a portion of the nut are threaded such that the nut and the cam are in threaded engagement with each other. In another embodiment, the key comprises a split sleeve key, wherein the split sleeve key includes a slit parallel to a longitudinal axis of the ferrule. In another embodiment, the key comprises a U shaped key, wherein the U shaped key has a height H and a width W, wherein a ratio of height H to width W ranges between 0.5:1 and 4:1. In another embodiment, the key comprises a key body defined by a straight portion and an angled portion of the key such that the key includes an opening defined by the straight portion and an angled portion of the key, wherein the straight portion engages with edges of the keyway. In another embodiment, wherein the key comprises a key body defined by a straight portion and an angled portion of the key; wherein the straight portion engages with edges of the keyway; wherein the key body further includes a plurality of slots within the key body; and wherein the plurality of slots comprises at least one slot spanning a portion of the straight portion and a portion of the angled portion of the key.

In one embodiment, a method of assembling a connector assembly is provided. The method of assembling a connector assembly comprising: inserting a plurality of optical fibers into an inner channel of a ferrule; inserting an adhesive into the inner channel; dicing the ferrule along a dicing plane at a dicing groove to form a first connector half and a second connector half, wherein the dicing plane has an angle θ relative to a longitudinal axis of the ferrule; preparing an adapter comprising a base coupled to a cap, wherein a key is coupled to the base and a sleeve is coupled to the cap; inserting the first connector half into the base of the adapter and into the sleeve and the key of the adapter; inserting the second connector half into the cap of the adapter and into the sleeve and the key of the adapter; wherein the sleeve covers the inner channel and the key is inserted into a keyway of the first and second connector halves; and wherein the sleeve and the key span the groove of the ferrule.

In another embodiment, the method further comprising: applying a nut downstream of the first connector half or the second connector half; applying a first housing downstream of the first connector half and a second housing downstream of the second connector half. In another embodiment, the method further comprising: installing a spring push onto either side of the ferrule; retaining a spring within the first housing and the second housing, wherein the spring is configured to bias the first connector half and the second connector half in opposite directions relative to each other; wherein the spring is received on the spring push that contacts the first connector half or the second connector half to transfer the biasing force to the connector assembly. In another embodiment, the angle θ ranges between 82° and 90°.

Additional features will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

FIG. 6 is a perspective view of a ferrule of the connector assembly of FIG. 3;

FIG. 7 is a front view of the ferrule of FIG. 6;

FIG. 15-23 are illustrations depicting a method of assembling a connector and a connector assembly in accordance with the present disclosure.

DETAILED DESCRIPTION

Various embodiments will be further clarified by examples in the description below. In general, the present disclosure relates to a matched pair detachable connector for high fiber count applications where the configuration of the connector maintains optical fiber alignment and ferrule alignment during assembly of the connector.

Figure 1:
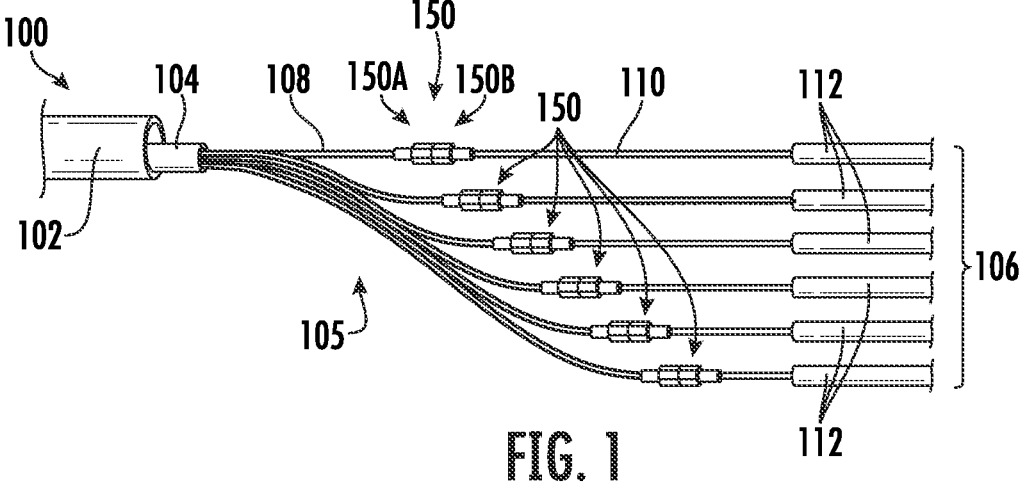
FIG. 1 is a side perspective view of a cable assembly in accordance with the present disclosure.

Referring first to FIG. 1, a cable assembly 100 is shown. Cable assembly 100 includes an outdoor cable 104 (e.g., a high fiber count cable) and an indoor cable 106 (e.g., a lower fiber count cable with a flame retardant jacket) that mate together as discussed herein. Outdoor cable 104 is fed through a duct 102 of a building (e.g., hyperscale datacenter, etc.) and includes multiple subunits 105. Subunits 105 comprise optical fibers 108 or optical fiber ribbons 108. Optical fibers 108 of outdoor cable 104 are configured to connect to optical fibers 110 of indoor cable 106 by a connector assembly 150 as discussed in greater detail herein. In some embodiments, the connection between optical fibers 108 and optical fibers 110 can comprise greater than 144 optical fibers, which are housed in connector assembly 150. Outdoor cable 104 is scalable to accommodate high optical fiber counts such as 6,912 optical fibers depending on the optical fiber diameters. In other embodiments, connector assembly 150 can be used with only indoor cables 106 or only outdoor cables 104.

Optical fibers 108, 110 may comprise different fiber types, different coating diameters, different ribbon formats, or a different combination of the above. In some embodiments, fiber types include standard single mode fibers or highly bend insensitive fibers. The fiber coating diameters include 250 μm, 200 μm, 180 μm, 160 μm and lower fiber coating diameters. The ribbon formats include fully encapsulated ribbon and rollable ribbon. Such combinations offer flexibility that can be tailored to different applications as opposed to the prior art where all the fiber attributes must be identical on both sides of the connection.

Figure 2:
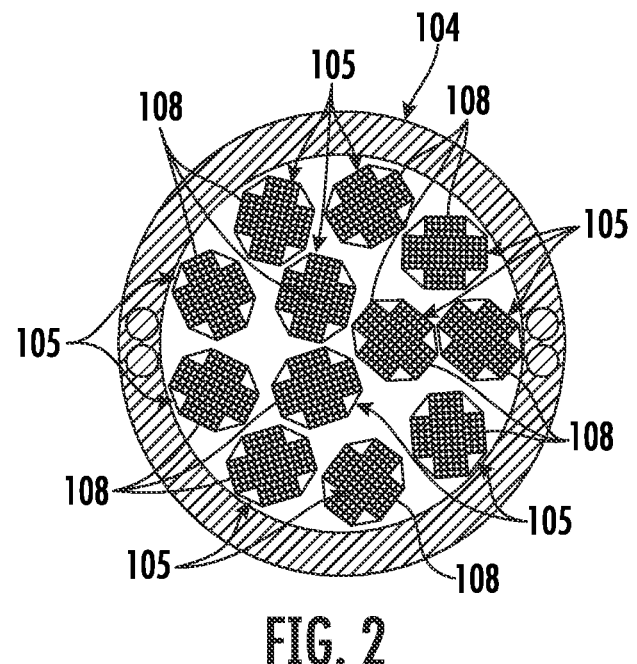
FIG. 2 is a cross-sectional view of an outdoor cable shown in the cable assembly of FIG. 1.

Referring briefly to FIG. 2, a cross-sectional view of an embodiment of outdoor cable 104 is shown in accordance with aspects of the present disclosure. As shown, outdoor cable 104 has 12 routable subunits 105; however, it is contemplated that in alternate embodiments, alternate number of subunits 105 may be included in outdoor cable 104. Each of the subunits 105 includes optical fibers 108 loosely disposed within the subunit 105 (e.g., in an essentially parallel array). In certain embodiments, the optical fibers 108 may be coated with a thin film of powder (e.g., chalk, talc, etc.) which forms a separation layer that prevents the fibers from sticking to the molten sheath material during extrusion.

Figure 18:
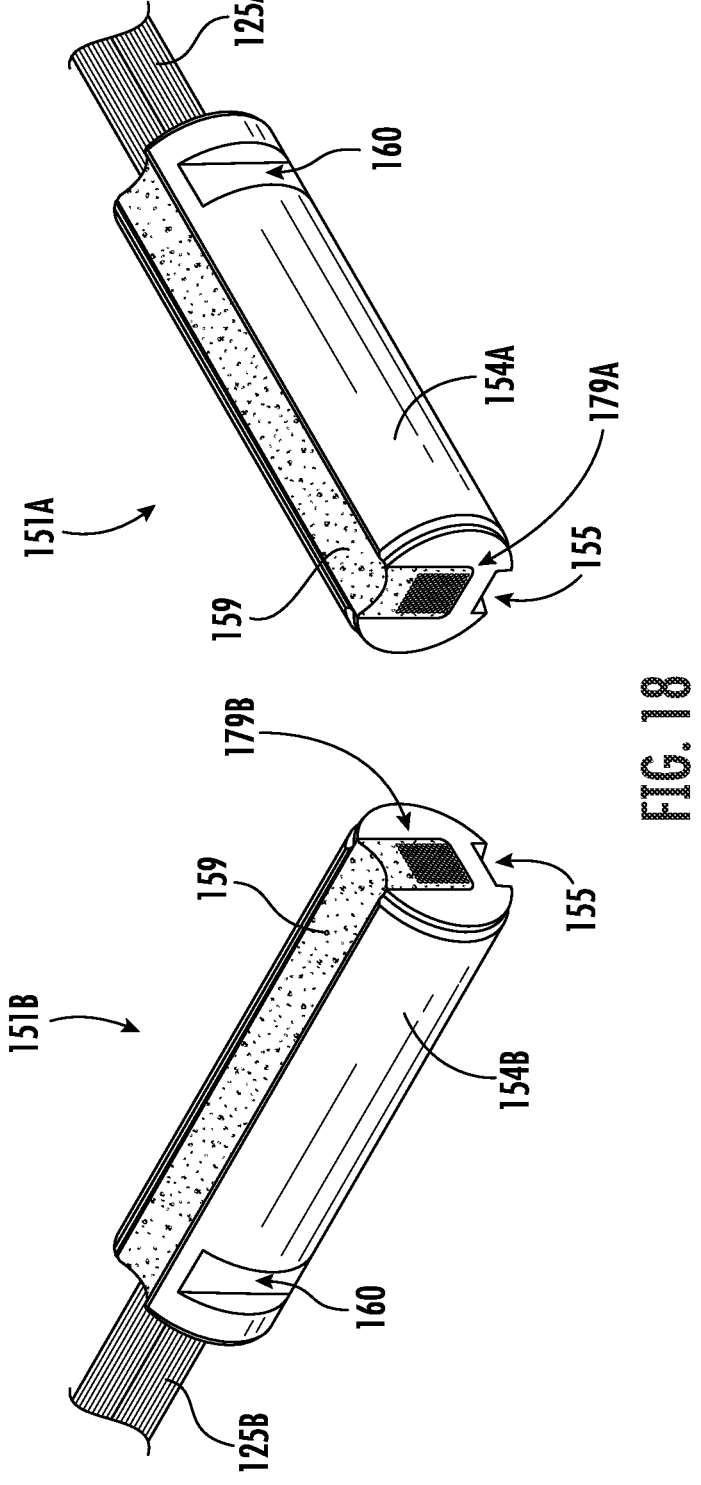

Referring back to FIG. 1, indoor cables 106 are generally housed within an interior of a building (e.g., hyperscale datacenter, etc.) and comprise an outer jacket 112 from which optical fibers 110 protrude. Each indoor cable 106 requires a smaller number of matched connections with outdoor cable 104. For example, a 288 fiber indoor cable 106 and a 288 fiber subunit 105 from outdoor cable 104 requires two 144 fiber matched connectors 150A, 150B (FIG. 18). As shown in FIG. 1, connector assemblies 150 are staggered so that cable assembly 100 can be enclosed in a pulling grip with a size close to the outer diameter of outside cable 104 for installation through duct 102. As also shown in FIG. 1, shows a fully assembled and terminated cable assembly 100 where each individual connection between optical fibers 108, 110 are housed in connector assembly 150.

While the above disclosure describes the use of connector assembly 150 with outdoor cable 104 and indoor cable 106, connector assembly 150 of the present disclosure can be used in alternate settings such as where connector assembly 150 is used with only indoor cables or optical fibers 125, for example, as discussed herein.

As used herein, "optical fibers" refer to either embodiment of singular, loose optical fibers or ribbonized optical fibers or stacked ribbonized optical fibers. Moreover, the present disclosure discusses dicing a connector 152 and optical fibers 125. In particular, when connector 152 is diced, connector 152 is diced into connectors 150A, 150B as discussed in greater detail herein. Similarly, when optical fibers 125 are diced, optical fibers 125 are diced into diced optical fibers 125A, 125B as discussed in greater detail herein.

Figure 3:
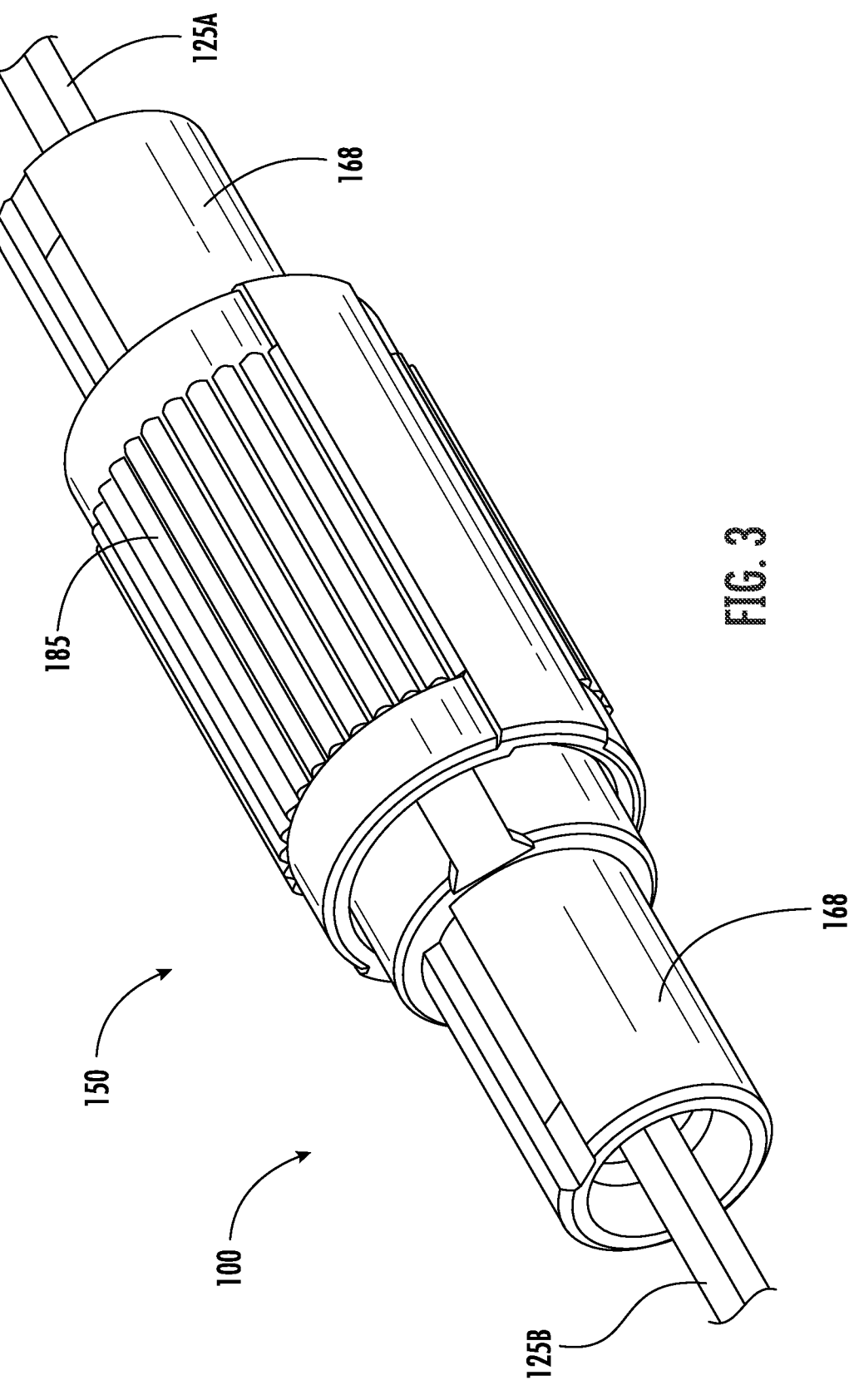
FIG. 3 is a perspective view of a connector assembly in accordance with the present disclosure.
Figure 4:
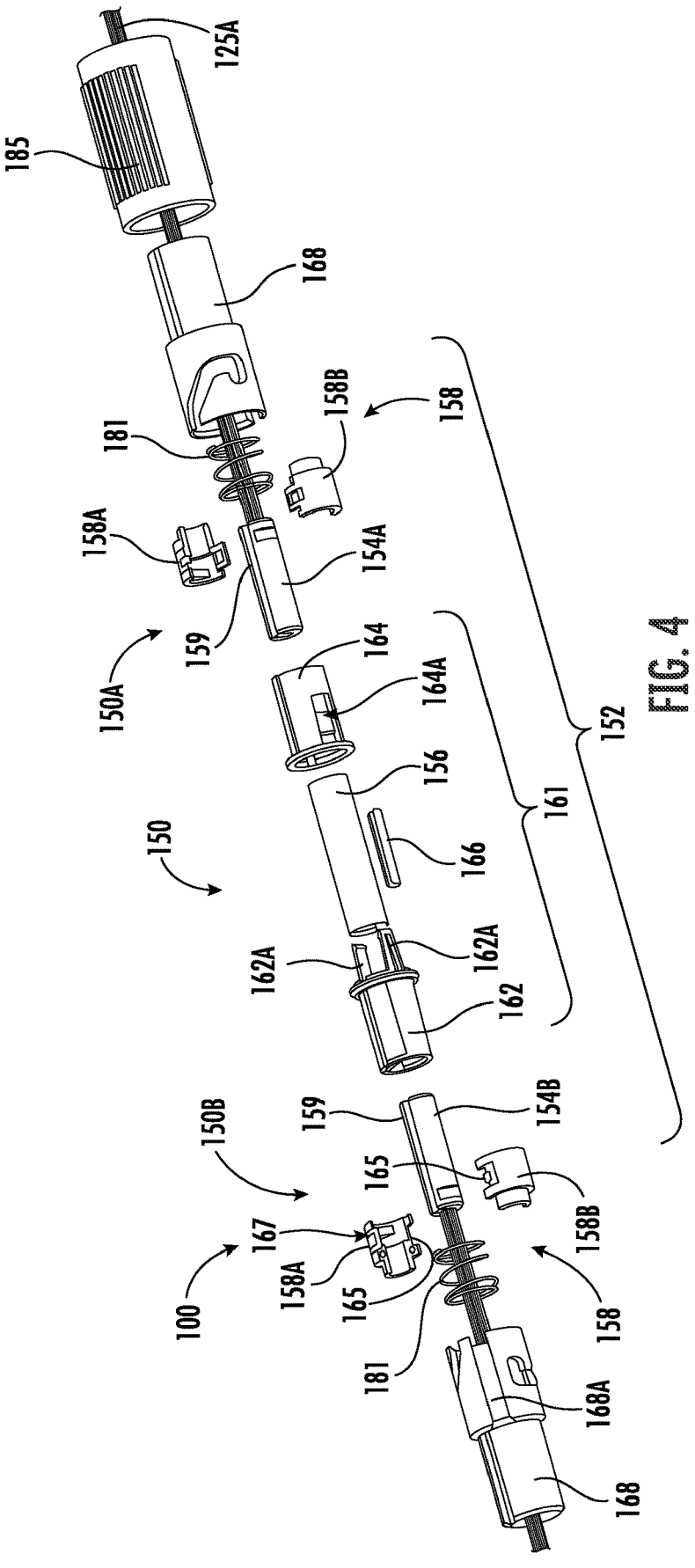
FIG. 4 is an exploded view of the connector assembly of FIG. 3.
Figure 5:
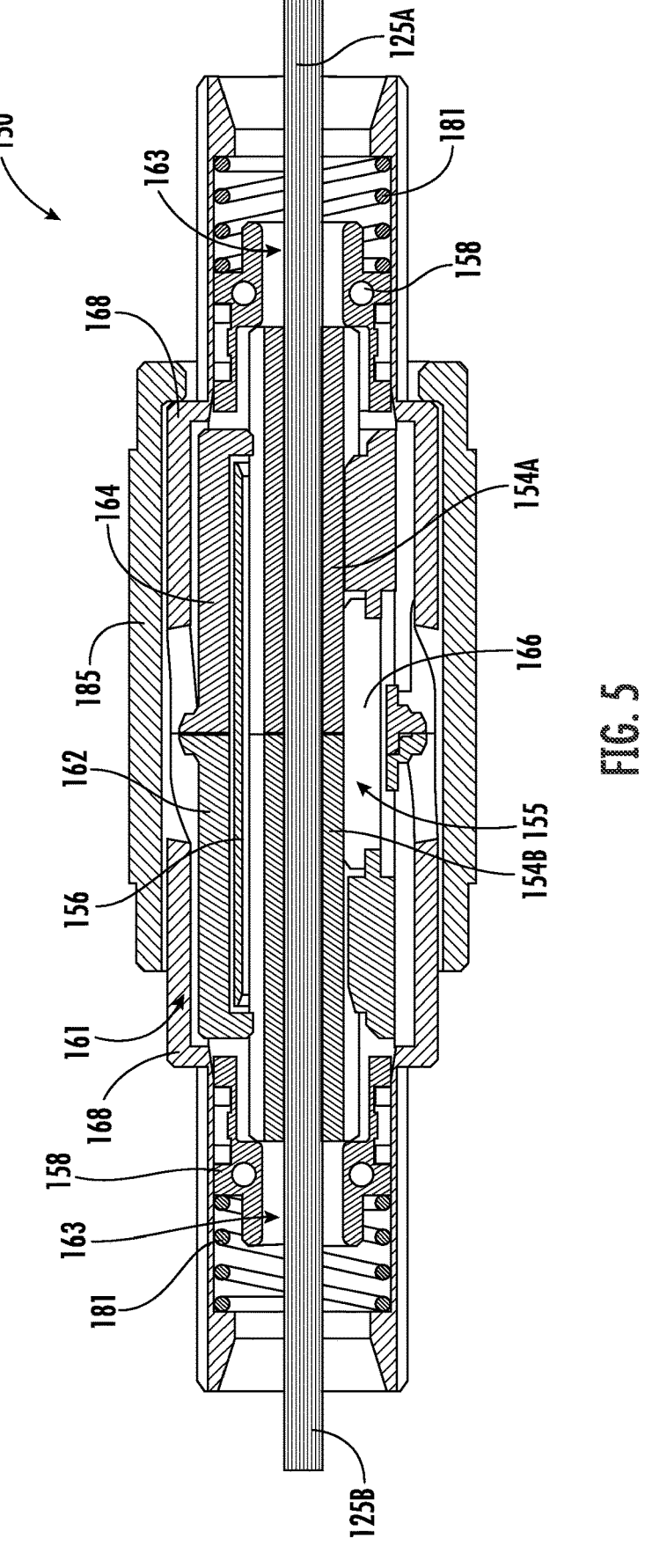
FIG. 5 is a cross-sectional view of the connector assembly of FIG. 3.

Referring now to FIGS. 3-5, optical fibers 125 are placed in a connector assembly 150. Connector assembly 150 comprises a connector 152, spring 181, housing 168, and nut 185. Connector 152 comprises a ferrule 154, key 166, sleeve 156, adapter 161 comprising a base 162 and a cap 164, and a spring push 158. It is within the scope of the present disclosure that in alternate embodiments, connector 152 comprises a ferrule 154, key 166, and adapter 161, and connector assembly 150 comprises spring push 158, spring 181, housing 168, and nut 185.

Referring now to FIGS. 6 and 7, ferrule 154 includes comprises at least one wall 151 to define an inner channel 153 along a longitudinal axis L of ferrule 154. Opposite inner channel 153 is a keyway 155 as shown. Keyway 155 is defined by an inner wall 155' and is configured to receive a key 166 as described in greater detail below. As shown, keyway 155 extends along a length of ferrule 154. However, it is within the scope of the present disclosure that keyway 155 extends along a portion of a length of ferrule 154. Stated another way, in an alternate embodiment, keyway 155 extends along at least a portion of a length of ferrule 154. In some embodiments, ferrule 154 is generally H-shaped. However, it is within the scope of the present disclosure that alternate shapes of ferrule 154 may be used. For example, ferrule 154 may include additional channels to house a greater number of optical fibers (e.g., more than 144 optical fibers such as 288 fiber or 432 fiber matched connector pairs). It is also within the scope of the present disclosure that in alternate embodiments, ferrule 154 may be modified to house fewer optical fibers (e.g., less than 144 optical fibers). Inner channel 153 is configured to house optical fibers 125 (shown in at least FIG. 5), and in some embodiments, optical fibers 125 are substantially parallel to longitudinal axis L of ferrule 154. As used herein, "substantially parallel" refers to parallel axes to within 0.15° relative to each other.

Referring briefly to FIGS. 4 and 5, inner channel 153 also receives a potting adhesive 159 configured to fill in the spaces between optical fibers 125 and to hold diced optical fibers 125A, 125B of optical fibers 125 in place to maintain alignment between connectors 150A, 150B and thereby, yielding improved insertion loss properties as discussed herein. To hold or encapsulate potting adhesive 159 within ferrule 154, a sleeve 156 and a spring push 158 (shown in at least FIGS. 4 and 5) are applied onto ferrule 154 as discussed in greater detail below. In some embodiments, cured potting adhesive 159 has a modulus of elasticity ranging between 0.1 GPa and 10 GPa, between 1 GPa and 5 GPa, or between 1 GPa and 3 GPa. As used herein, "cured potting adhesive" refers to when potting adhesive 159 reaches full bonding strength. In some embodiments, potting adhesive 159 has a shrinkage ratio (volume reduction after curing) ranging between 0.1% and 5%, between 0.5% and 3%, or between 0.5% and 2%. In some embodiments, potting adhesive 159 has a coefficient of thermal expansion ranging between $10\times10^{-6}$ PC and $200\times10^{-6}$ PC, between $20\times10^{-6}/°$ C. and $150\times10^{-6}$ PC, or between $20\times10^{-6}$ PC and $100\times10^{-6}/°$ C.

Referring back to FIGS. 6 and 7, ferrule 154 also includes a groove 160 that extends about a circumference of ferrule 154 along surface S of ferrule 154. Groove 160 is configured to receive spring push 158 during assembly of connector assembly 150.

Ferrule 154 further comprises a dicing groove or center groove 157. Dicing groove 157 identifies approximately where ferrule 154 is to be diced to form connectors 150A, 150B. That is, dicing groove 157 defines a dicing plane P (that is co-planar with dicing groove 157) through which ferrule 154 and housed optical fibers 125 are diced as discussed in greater detail below. In some embodiments, dicing plane P is perpendicular to longitudinal axis L. In some embodiments, dicing plane P is angled with respect to longitudinal axis L to enhance return loss performance of connector assembly 150. In some embodiments, dicing plane P has an angle θ ranging between 1° and 8°, between 2° and 7°, or between 3° and 6° off 90° with respect to longitudinal axis L. Stated another way, angle θ ranges between 82° and 89°, 83° and 88°, or 84° and 87° with respect to longitudinal axis L. In some embodiments, dicing plane P has an angle θ of about 8° off 90° with respect to longitudinal axis L. Stated another way, in some embodiments, angle θ is about 82° with respect to longitudinal axis L. In some embodiments, when dicing plane P is angled, the splice joints 115 of optical fibers 125 are staggered in accordance with the angle of dicing plane P relative to longitudinal axis L.

Figures 8, 8A:
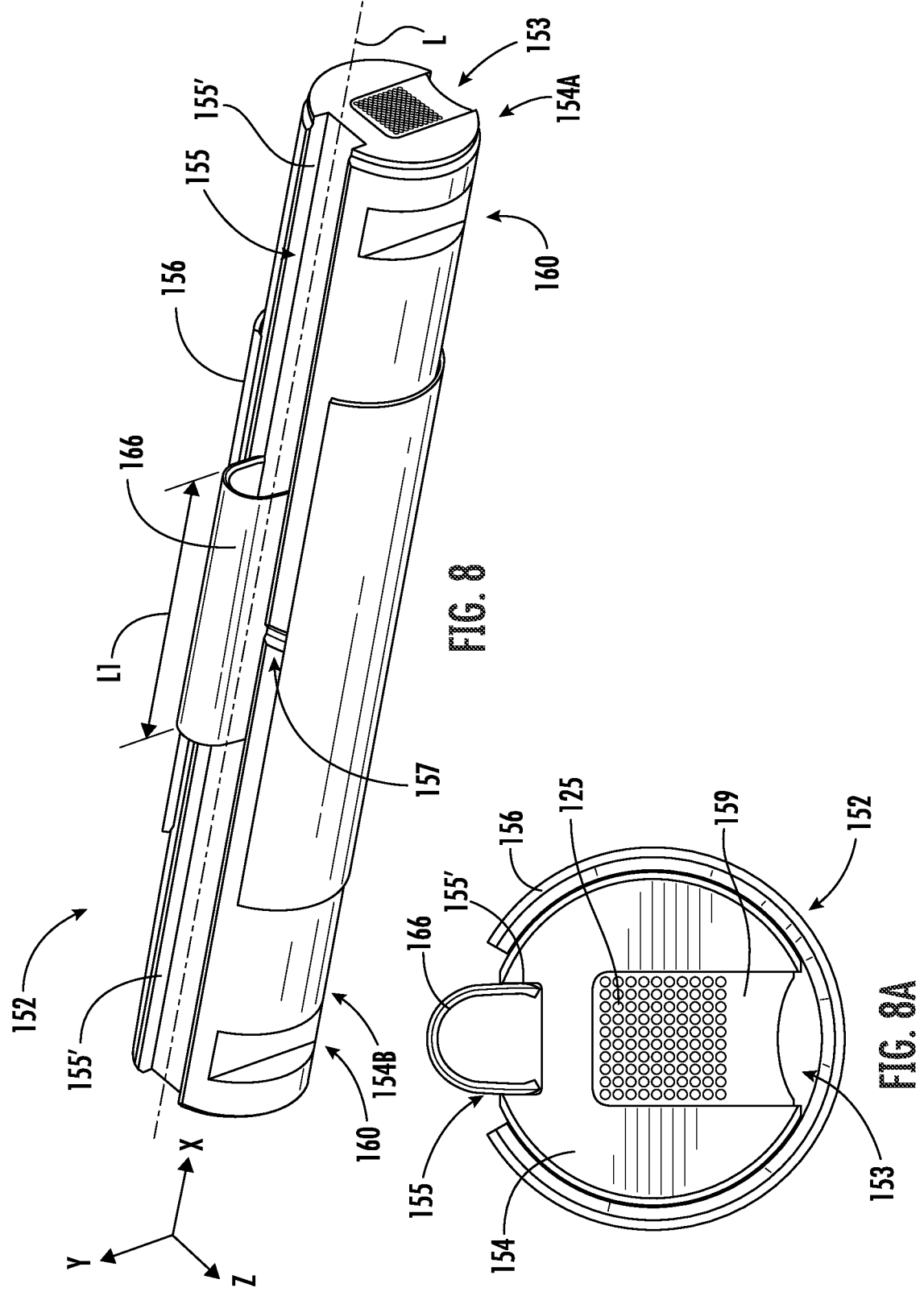
FIG. 8 is a front view of an embodiment of a connector of the connector assembly of FIG. 3.
FIG. 8A is a perspective view of the connector of FIG. 8.

As mentioned previously, connector 152 further comprises a sleeve 156 and a spring push 158. Sleeve 156 is applied onto the circumference of ferrule 154 as shown in FIG. 8. Sleeve 156 spans a portion of the circumference or outer surface S (FIG. 6) of ferrule 154 such that inner channel 153 is covered as shown in at least FIG. 8. In addition, when sleeve 156 is applied onto ferrules 154A, 154B, sleeve 156 covers dicing groove 157 along longitudinal axis L. Sleeve 156 is configured to hold ferrules 154A, 154B together such that radial alignment of ferrules 154A, 154B is maintained thereby maintaining the alignment of the housed optical fibers 125. As discussed below, alignment of ferrules 154A, 154B is maintained by a key 166 along with sleeve 156. Key 166 is configured to fit into keyway 155 and limit rotational movement (about the x-axis as defined in Cartesian coordinate system defined in Figure) of ferrules 154A, 154B about longitudinal axis L when ferrules 154A, 154B are aligned with each other. Key 166 has a length L1 such that key 166 spans or crosses dicing groove 157 when installed into keyway 155. Various embodiments of ferrule 154, sleeve 156, and key 166 are shown in FIGS. 8-14 and discussed in greater detail below. In some embodiments, sleeve 156 includes a slit that extends linearly along the length of sleeve 156 to provide a gap in covering the circumference of ferrule 154. In some embodiments, the gap of sleeve 156 is aligned with at least a portion of keyway 155 of ferrule 154. In some embodiments, the gap of sleeve 156 is aligned with at least a portion of inner channel 153 of ferrule 154. However, it is within the scope of the present disclosure that in alternate embodiments, sleeve 156 has alternate configurations with respect to ferrule 154 (e.g., the sleeve 156 has a slit that is angled with respect to a plane perpendicular to longitudinal axis L in the y direction). In some embodiments, sleeve 156 has a uniform thickness. However, in alternate embodiments, sleeve 156 has a non-uniform thickness. As used herein, "radial alignment" refers to alignment of components in a direction outwardly from a longitudinal axis L (i.e., x and y directions as defined in the Cartesian coordinate system shown in the Figure) where longitudinal axis L is a center from which the radial alignment extends.

FIGS. 8-14 as discussed below show various embodiments of connector 152 and the corresponding configurations of ferrule 154, sleeve 156, and key 166.

Referring first to FIGS. 8 and 8A, an embodiment of connector 152, and the configuration of ferrule 154, sleeve 156, and key 166 is shown. As shown, ferrule 154 includes inner channel 153 where optical fibers 125 are housed, and a keyway 155 where key 166 is inserted. As shown, key 166 is a split sleeve key that includes a slit that is parallel with longitudinal axis L of ferrule 154. Key 166 is inserted into keyway 155 such that length L1 of key 166 crosses dicing groove 157. When key 166 is inserted into keyway 155 as shown, key 166 engages with inner wall 155' and applies an outward force onto inner wall 155' across dicing groove 157 and thereby, provides rotational alignment about longitudinal axis L (i.e., preventing rotational movement about the x-axis as defined in the Cartesian coordinate system shown in the Figure) of ferrules 154A, 154B. Stated another way, key 166 prevents rotational movement of ferrules 154A, 154B about longitudinal axis L that could cause fiber misalignment of optical fibers 125 housed within ferrules 154A, 154B. In some embodiments, key 166 is made of ceramic material or a spring metal such as phosphor bronze, beryllium copper, stainless steel, etc. In some embodiments, key 166 has a length L1 ranging between 3 mm and 80 mm, between 3 mm and 40 mm, or between 3 mm and 10 mm. As used herein, "rotational alignment" refers to alignment of components in a direction about a longitudinal axis L of optical fibers 125 where longitudinal axis L is the axis of rotation.

Figures 9, 9A:
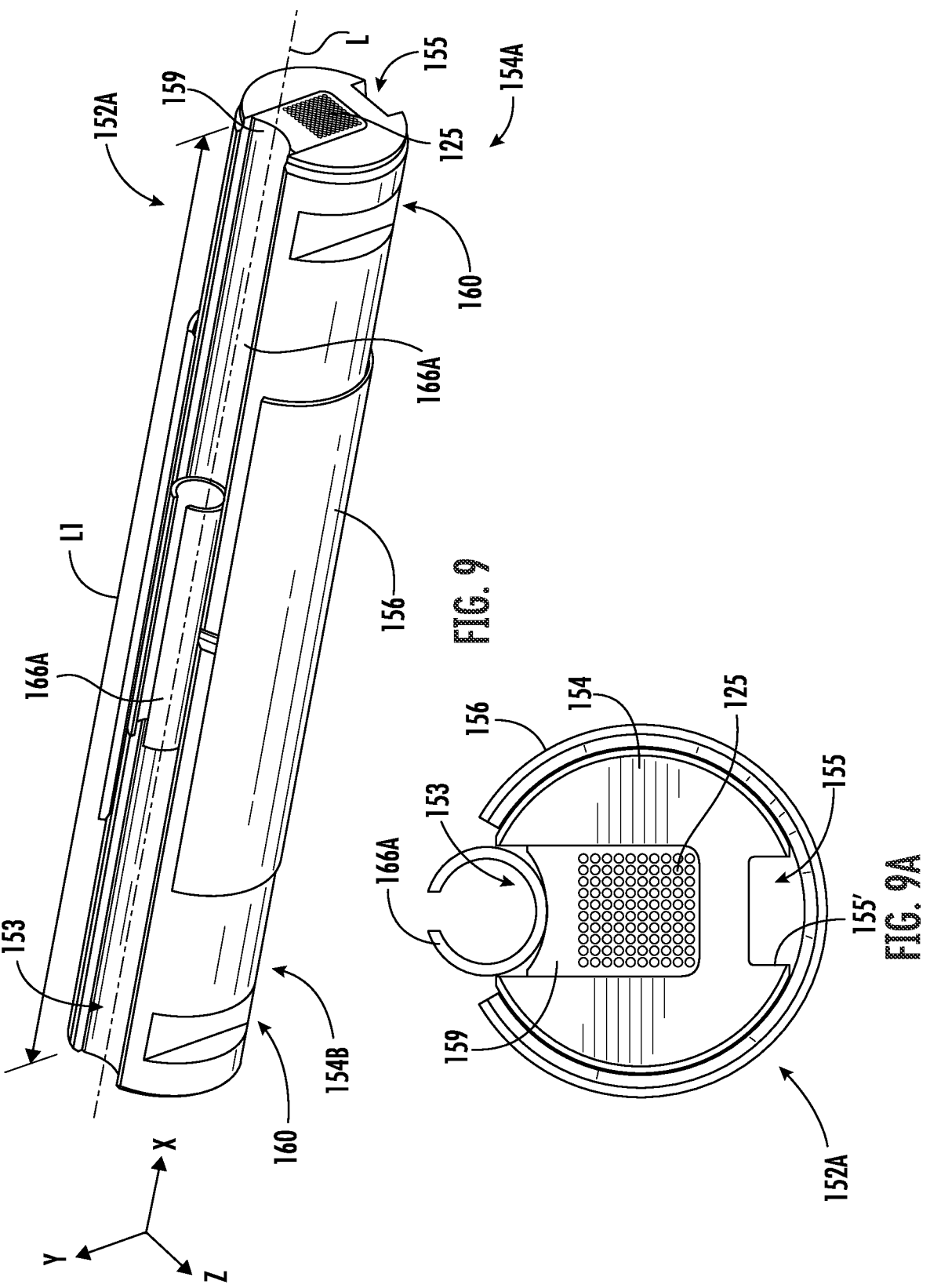
FIG. 9 is a front view of an alternate embodiment of a connector of the connector assembly of FIG. 3.
FIG. 9A is a perspective view of the connector of FIG. 9.

Referring now to FIGS. 9 and 9A, an alternate embodiment of connector 152 (referred to as "connector 152A") and the configuration of ferrule 154, sleeve 156, and key 166 are shown. In this embodiment, the components that are consistent with those disclosed in reference to FIG. 8 will have the same reference numbers, and the components that differ will have the letter "A" placed along the same reference number. Similar to connector 152 of FIG. 8, ferrule 154 includes inner channel 153 where optical fibers 125 are housed. However, while a keyway 155 is shown in this embodiment, keyway 155 is not required because key 166A is inserted into inner channel 153. As shown, key 166A is a split alignment sleeve key, and similar to key 166 in FIGS. 8 and 8A, key 166A inserted into keyway 155 such that length L1 of key 166A crosses dicing groove 157. Key 166A engages with wall 151 of inner channel 153, and by engaging with wall 151 of inner channel 153 across dicing groove 157, key 166A applies an outward force onto wall 151 across dicing groove 157 thereby providing rotational alignment about longitudinal axis L (i.e., preventing rotational movement about the x-axis as defined in the Cartesian coordinate system shown in the Figure) of ferrules 154A, 154B. Stated another way, key 166 prevents rotational movement of ferrules 154A, 154B about longitudinal axis L that could cause fiber misalignment of optical fibers 125 housed within ferrules 154A, 154B. In some embodiments, key 166 is made of ceramic material or a spring metal such as phosphor bronze, beryllium copper, stainless steel, etc. In some embodiments, key 166 has a length L1 ranging between 3 mm and 80 mm, between 3 mm and 40 mm, or between 3 mm and 10 mm.

Figures 10, 10A:
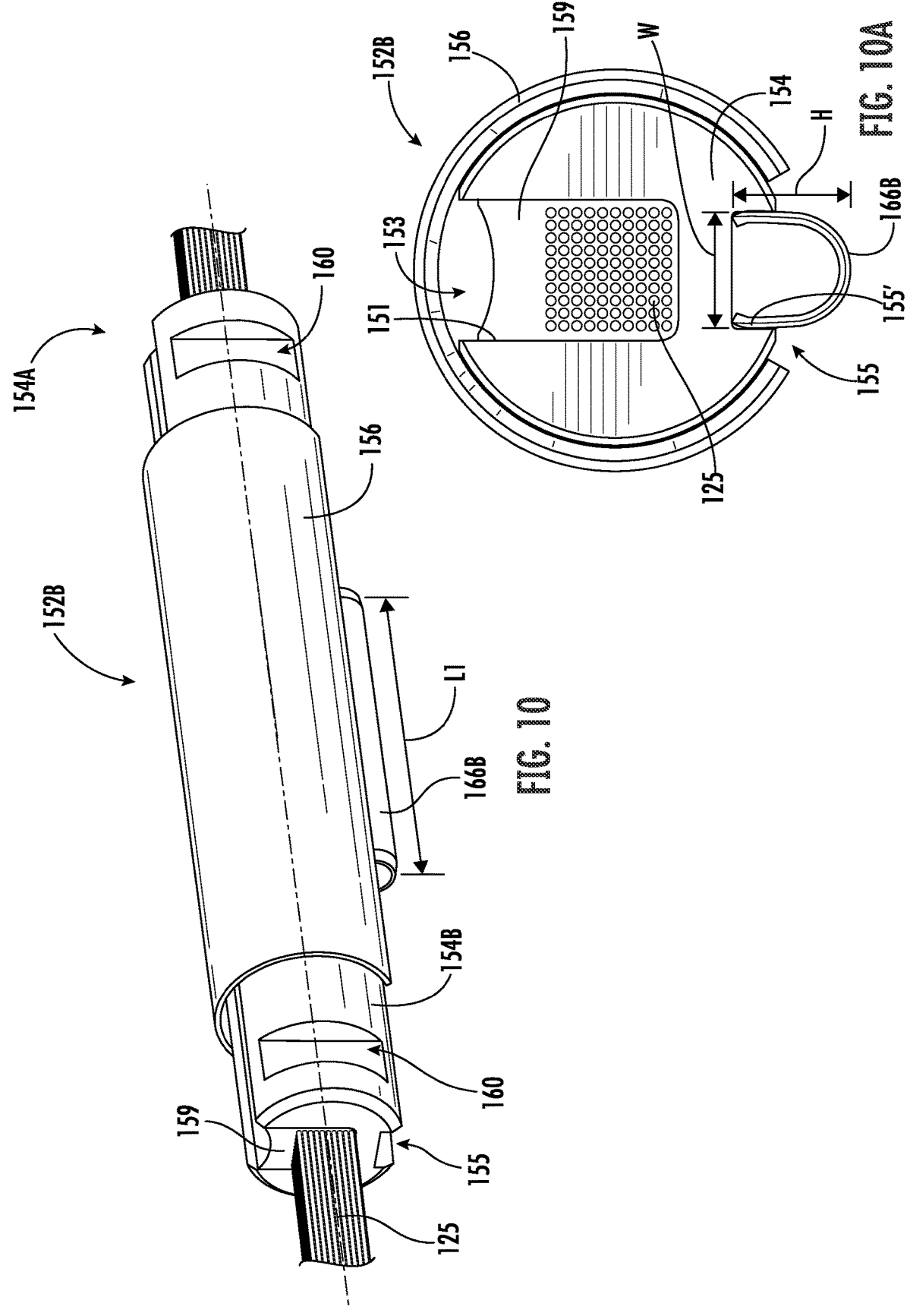
FIG. 10 is a front view of an alternate embodiment of a connector of the connector assembly of FIG. 3.
FIG. 10A is a perspective view of the connector of FIG. 10.

Referring now to FIGS. 10 and 10A, an alternate embodiment of connector 152 (referred to as "connector 152B") and the configuration of ferrule 154, sleeve 156, and key 166B are shown. As mentioned previously, in this embodiment, the components that are consistent with those disclosed in reference to FIG. 8 will have the same reference numbers, and the components that differ will have the letter "B" placed along the same reference number. As shown, ferrule 154 includes inner channel 153 where optical fibers 125 are housed, and a keyway 155 where key 166B is inserted. Key 166B is a semi circular or U-shaped key. In some embodiments, key 166B has a height H to width W ratio ranging between 0.5:1 and 4:1, between 0.5:1 and 3.5:1, or between 0.5:1 and 3:1. As mentioned previously, key 166B that is inserted into keyway 155 such that length L1 of key 166B crosses dicing groove 157. When key 166B is inserted into keyway 155 as shown, key 166B engages with inner wall 155' and applies an outward force onto inner wall 155' across dicing groove 157 thereby, providing rotational alignment about longitudinal axis L (i.e., preventing rotational movement about the x-axis as defined in the Cartesian coordinate system shown in the Figure) of ferrules 154A, 154B. Stated another way, key 166B prevents rotational movement of ferrules 154A, 154B about longitudinal axis L that could cause fiber misalignment of optical fibers 125 housed within ferrules 154A, 154B. In some embodiments, key 166B is made of ceramic material or a spring metal such as phosphor bronze, beryllium copper, stainless steel, etc. In some embodiments, key 166 has a length L ranging between 3 mm and 80 mm, between 3 mm and 40 mm, or between 3 mm and 10 mm. As used herein, "rotational alignment" refers to alignment of components in a direction about a longitudinal axis L of optical fibers 125 where longitudinal axis L is the axis of rotation.

Figures 11, 11A, 11B:
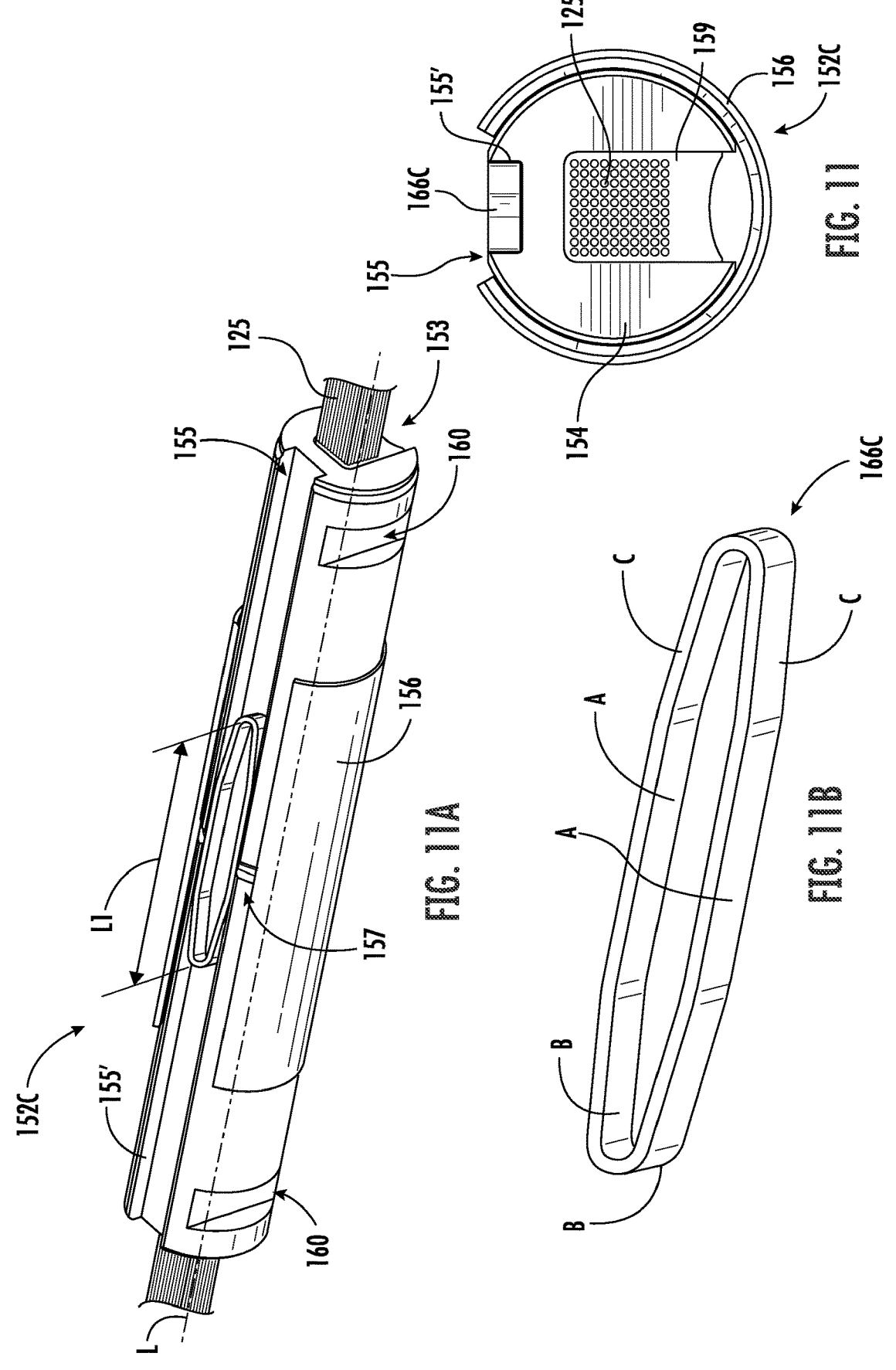
FIG. 11 is a front view of an alternate embodiment of a connector of the connector assembly of FIG. 3.
FIG. 11A is a perspective view of the connector of FIG. 11.
FIG. 11B is a perspective view of a key used in the connector of FIG. 11.

Referring now to FIGS. 11-11B, an alternate embodiment of connector 152 (referred to as "connector 152C") and the configuration of ferrule 154, sleeve 156, and key 166C are shown. As mentioned previously, in this embodiment, the components that are consistent with those disclosed in reference to FIG. 8 will have the same reference numbers, and the components that differ will have the letter "C" placed along the same reference number. As shown, ferrule 154 includes inner channel 153 where optical fibers 125 are housed, and a keyway 155 where key 166C is inserted. Key 166C is a hexagonal, closed leaf shaped key. As shown in FIG. 11B, key 166C comprises a key body and has a pair of parallel straight sides A that are between pairs of converging sides B, C that close the shape of key 166C. In this embodiment, the key body of key 166C comprises an opening that is defined by the pair of parallel straight sides A and the pairs of converging sides B, C that define and close the shape of key 166C. Key 166C is inserted into keyway 155 such that length L1 of key 166C crosses dicing groove 157, and straight sides A engage with inner wall 155' of keyway 155. When key 166C engages with inner wall 155' across dicing groove 157, key 166C applies an outward force onto inner wall 155' across dicing groove 157 and thereby, provides rotational alignment about longitudinal axis L (i.e., preventing rotational movement about the x-axis as defined in the Cartesian coordinate system shown in the Figure) of ferrules 154A, 154B. Stated another way, key 166 prevents rotational movement of ferrules 154A, 154B about longitudinal axis L that could cause fiber misalignment of optical fibers 125 housed within ferrules 154A, 154B. In some embodiments, key 166C is made of ceramic material or a spring metal such as phosphor bronze, beryllium copper, stainless steel, etc. In some embodiments, key 166C has a length L1 ranging between 3 mm and 80 mm, between 3 mm and 40 mm, or between 3 mm and 10 mm.

Figures 12, 12A, 12B:
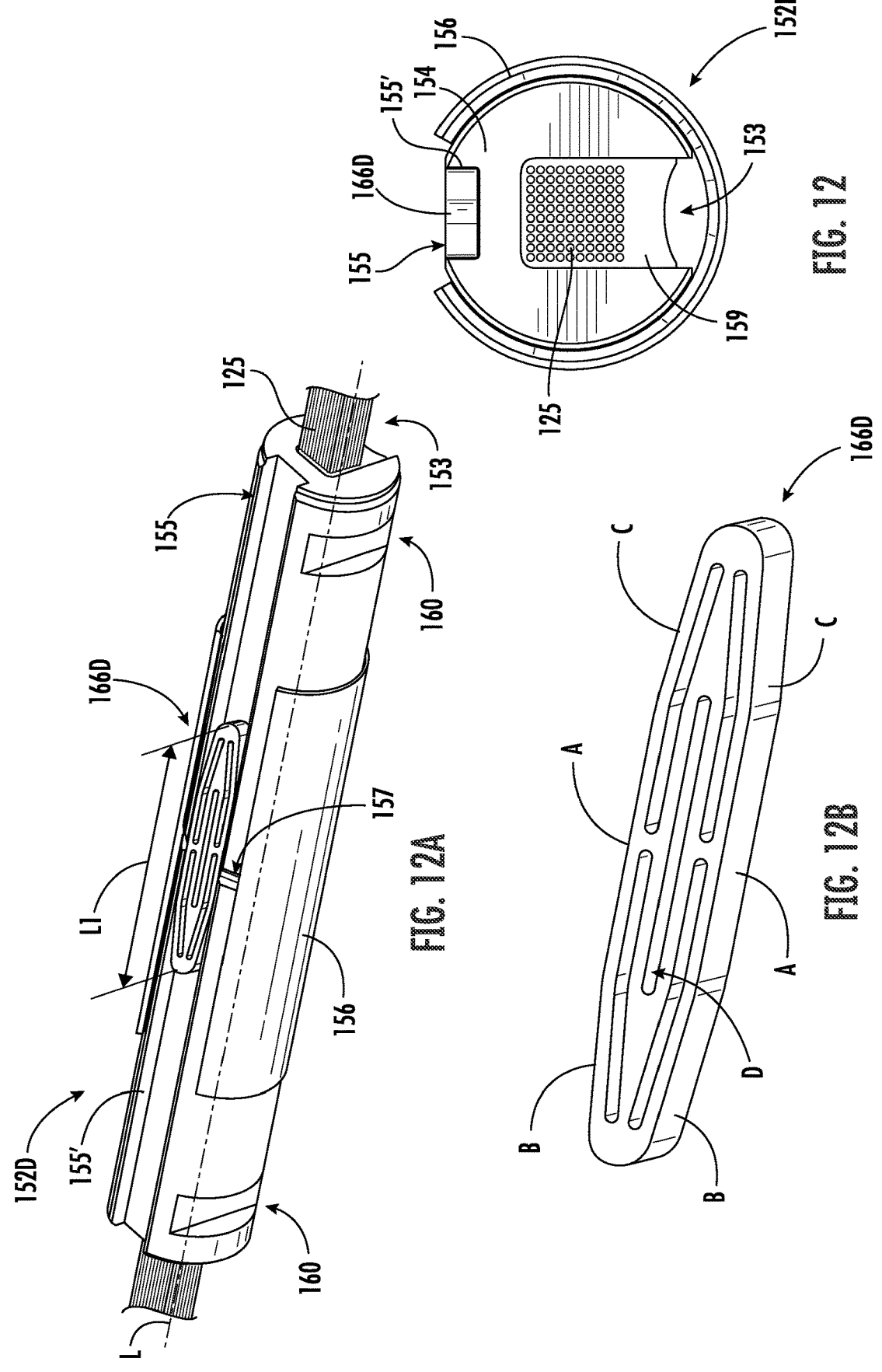
FIG. 12 is a front view of an alternate embodiment of a connector of the connector assembly of FIG. 3.
FIG. 12A is a perspective view of the connector of FIG. 12.
FIG. 12B is a perspective view of a key used in the connector of FIG. 12.

Referring now to FIGS. 12-12B, an alternate embodiment of connector 152 (referred to as "connector 152D") and the configuration of ferrule 154, sleeve 156, and key 166D are shown. In this embodiment, the components that are consistent with those disclosed in reference to FIG. 8 will have the same reference numbers, and the components that differ will have the letter "D" placed along the same reference number. As shown, ferrule 154 includes inner channel 153 where optical fibers 125 are housed, and a keyway 155 where key 166D is inserted. Similar to key 166C, key 166D is a hexagonal, closed leaf shaped key. As shown in FIG. 12B, key 166D comprises a key body and has a pair of parallel straight sides A that are interposed between pairs of converging sides B, C that close the shape of key 166D. Key 166D is filled within the boundaries defined by sides A, B, and C to define the key body, and the key body of key 166D includes a plurality of slots D within the boundaries defined by sides A, B, and C. Slots D are configured to provide additional force stability and force tolerance for key 166D. Key 166D is inserted into keyway 155 such that length L1 of key 166D crosses dicing groove 157 and straight sides A engage with inner wall 155' of keyway 155. When key 166D engages with inner wall 155' across dicing groove 157, key 166D applies an outward force onto inner wall 155' across dicing groove 157 and thereby, provides rotational alignment about longitudinal axis L (i.e., preventing rotational movement about the x-axis as defined in the Cartesian coordinate system shown in the Figure) of ferrules 154A, 154B. Stated another way, key 166D prevents rotational movement of ferrules 154A, 154B about longitudinal axis L that could cause fiber misalignment of optical fibers 125 housed within ferrules 154A, 154B. In some embodiments, key 166D is made of ceramic material or a spring metal such as phosphor bronze, beryllium copper, stainless steel, etc. In some embodiments, key 166D has a length L1 ranging between 3 mm and 80 mm, between 3 mm and 40 mm, or between 3 mm and 10 mm.

Figures 13, 13A, 13B:
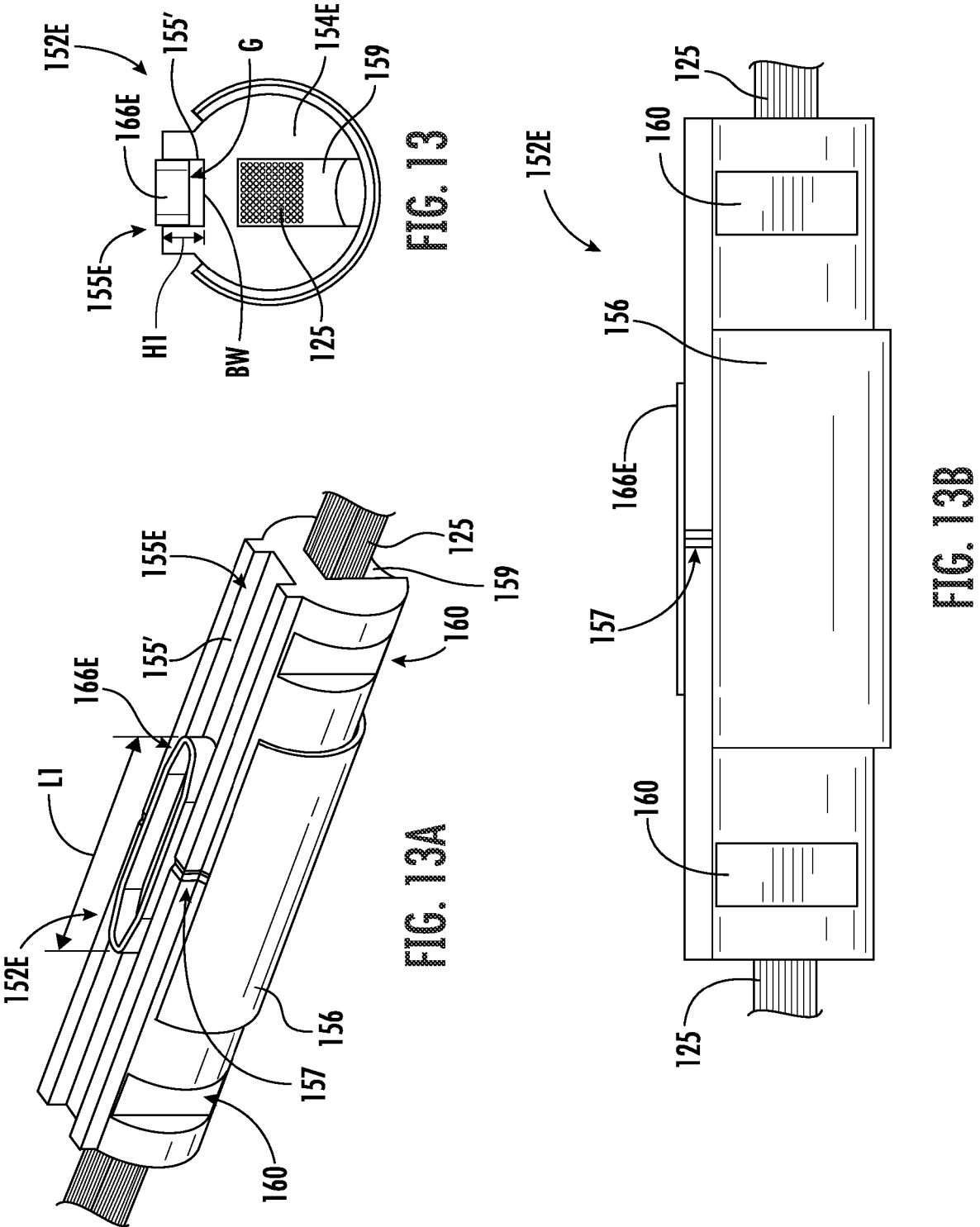
FIG. 13 is a front view of an alternate embodiment of a connector of the connector assembly of FIG. 3.
FIG. 13A is a perspective view of the connector of FIG. 13.
FIG. 13B is a side view of the connector of FIG. 13.

Referring now to FIGS. 13-13B, an alternate embodiment of connector 152 (referred to as "connector 152E") and the configuration of ferrule 154E, sleeve 156, and key 166E are shown. As mentioned previously, in this embodiment, the components that are consistent with those disclosed in reference to FIG. 8 will have the same reference numbers, and the components that differ will have the letter "E" placed along the same reference number. As shown, ferrule 154E includes inner channel 153 where optical fibers 125 are housed, and a keyway 155E where key 166E is inserted. Keyway 155E is defined by inner wall 155' that has a height H1 in this embodiment such that when key 166E in inserted into keyway 155E, there is a gap G from a bottom wall BW of inner wall 155' and key 166E. Inner walls 155' with a height H1 provide additional surface area for contact with key 166E. As discussed herein, a taller keyway 155E may enable additional keys 166 with different configurations to be used.

In the embodiment shown, key 166E is the same as key 166C of FIG. 11B. However, it is within the scope of the present disclosure that alternate keys may be used. Key 166E is inserted into keyway 155E such that length L1 of key 166E crosses dicing groove 157 and straight sides A engage with inner wall 155' of keyway 155. When key 166E engages with inner wall 155' across dicing groove 157, key 166E applies an outward force onto inner wall 155' across dicing groove 157 and thereby, provides rotational alignment about longitudinal axis L (i.e., preventing rotational movement about the x-axis as defined in the Cartesian coordinate system shown in the Figure) of ferrules 154A, 154B. Stated another way, key 166E prevents rotational movement of ferrules 154A, 154B about longitudinal axis L that could cause fiber misalignment of optical fibers 125 housed within ferrules 154A, 154B. In some embodiments, key 166E is made of ceramic material or a spring metal such as phosphor bronze, beryllium copper, stainless steel, etc. In some embodiments, key 166E has a length L1 ranging between 3 mm and 80 mm, between 3 mm and 40 mm, or between 3 mm and 10 mm.

Figures 14, 14A, 14B:
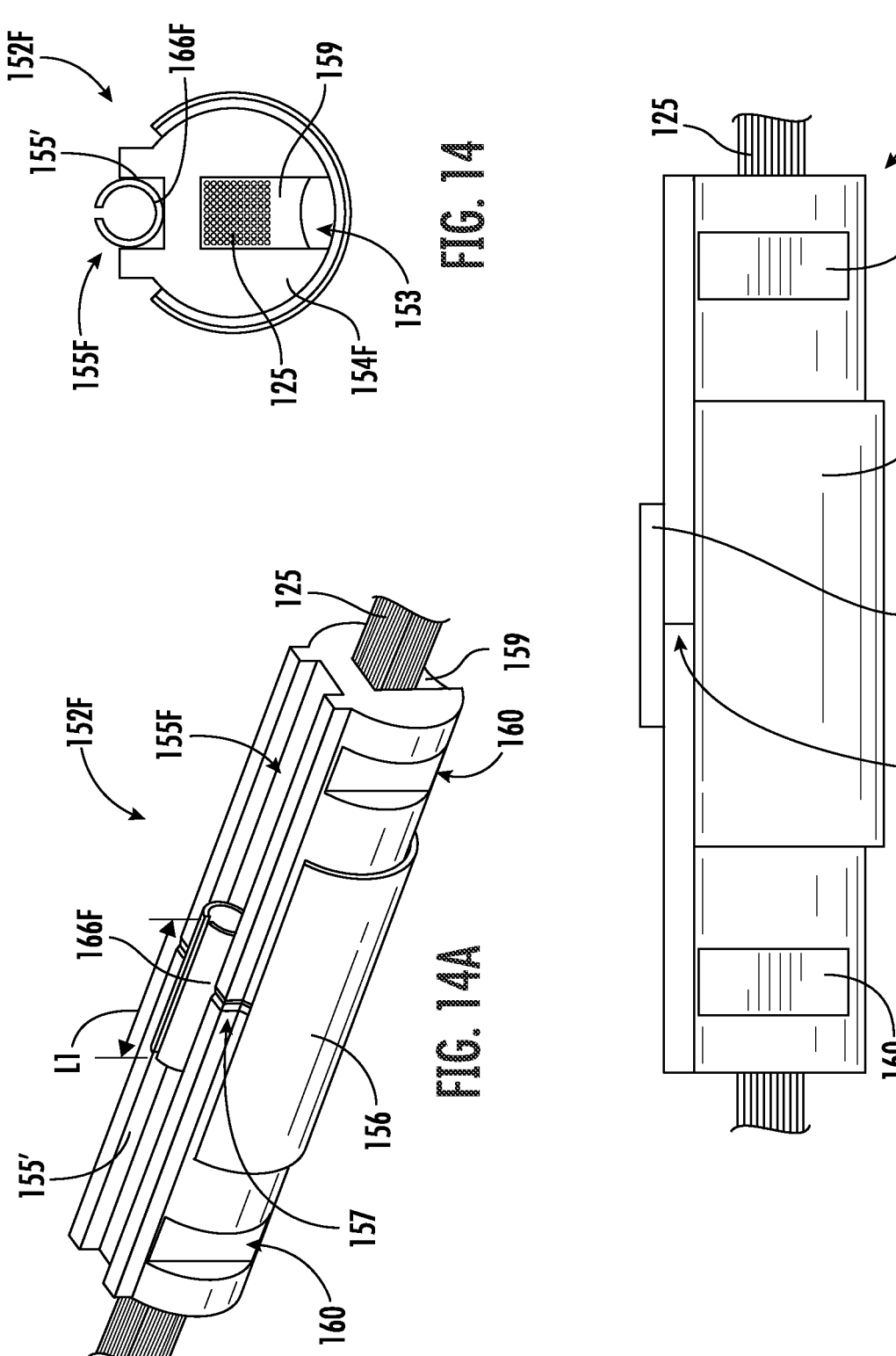
FIG. 14 is a front view of an alternate embodiment of a connector of the connector assembly of FIG. 3.
FIG. 14A is a perspective view of the connector of FIG. 14.
FIG. 14B is a side view of the connector of FIG. 14.

Referring now to FIGS. 14-14B, an alternate embodiment of connector 152 (referred to as "connector 152F") and the configuration of ferrule 154F, sleeve 156, and sleeve 156F are shown. In this embodiment, the components that are consistent with those disclosed in reference to FIG. 8 will have the same reference numbers, and the components that differ will have the letter "F" placed along the same reference number. As shown, ferrule 154E includes inner channel 153 where optical fibers 125 are housed, and a keyway 155F where key 166F is inserted. Keyway 155F is the same as keyway 155E of FIG. 13. In the embodiment shown, key 166F is the same as key 166A of FIG. 9A. However, it is within the scope of the present disclosure that alternate keys may be used. Key 166F is inserted into keyway 155F such that length L1 of key 166F crosses dicing groove 157 and engages with inner wall 155' of keyway 155F. When key 166F engages with inner wall 155' across dicing groove 157, key 166F applies an outward force onto inner wall 155' across dicing groove 157 and thereby, provides rotational alignment about longitudinal axis L (i.e., preventing rotational movement about the x-axis as defined in the Cartesian coordinate system shown in the Figure) of ferrules 154A, 154B. Stated another way, key 166F prevents rotational movement of ferrules 154A, 154B about longitudinal axis L that could cause fiber misalignment of optical fibers 125 housed within ferrules 154A, 154B. In some embodiments, key 166F is made of ceramic material or a spring metal such as phosphor bronze, beryllium copper, stainless steel, etc. In some embodiments, key 166F has a length L1 ranging between 3 mm and 80 mm, between 3 mm and 40 mm, or between 3 mm and 10 mm.

Figures 21A, 21B, 21C:
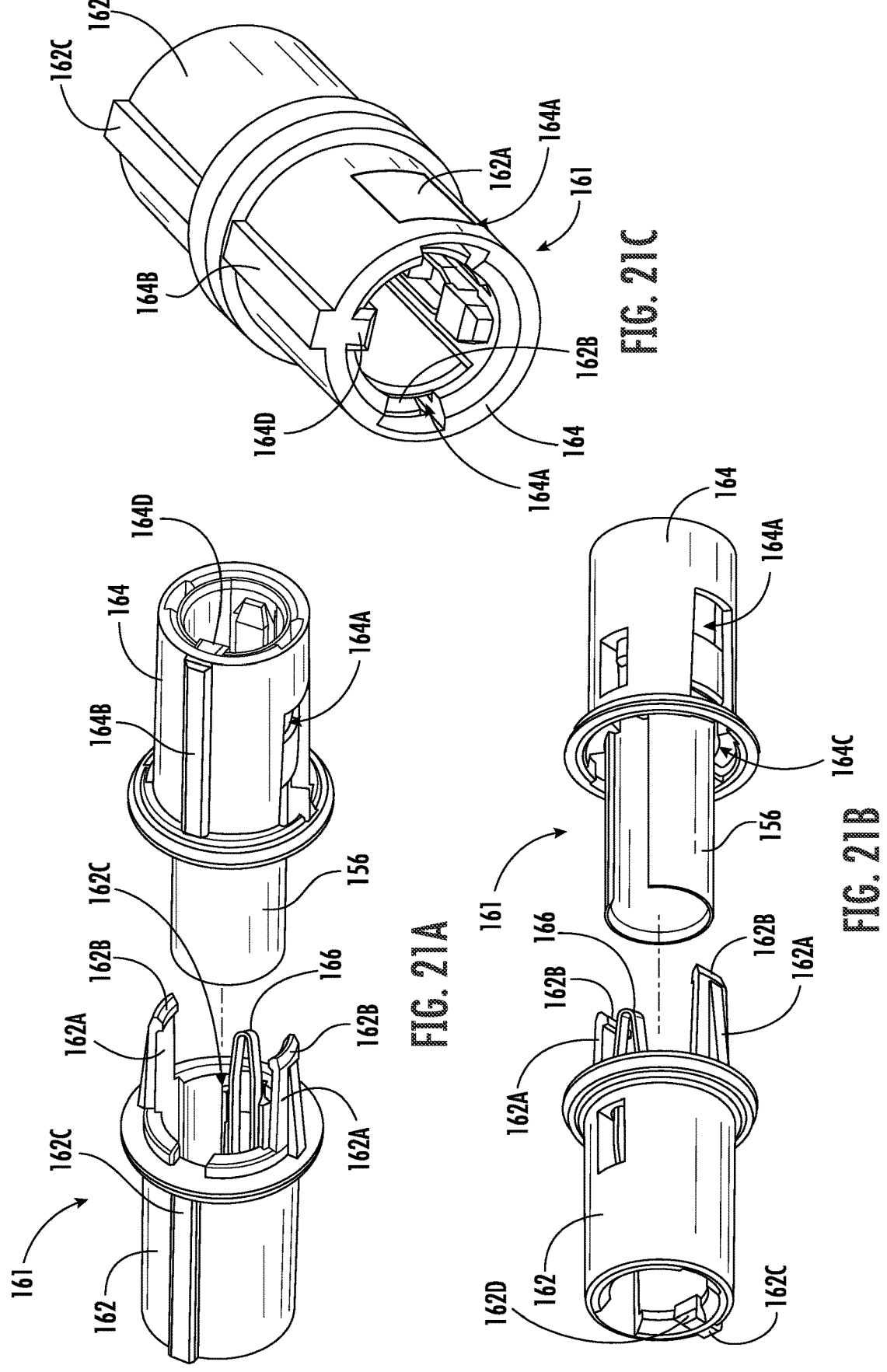

As mentioned previously, connector 152 comprises a ferrule 154, key 166, sleeve 156, and an adapter 161, and a spring push 158. Referring briefly to FIGS. 21A-21C, adapter 161 comprises a base 162 and a cap 164. Base 162 and cap 164 are configured to couple to each other and house key 166 and sleeve 156, respectively. As shown, base 162 includes a pair of arms 162A that are configured to engage with cap 164. In particular, arms 162A each include a protrusion 162B that is configured to be received in a corresponding aperture 164A of cap 164 as discussed in greater detail herein. In some embodiments, protrusions 162B are integrally formed with arms 162A. However, it is within the scope of the present disclosure that in alternate embodiments, protrusions 162B are coupled to arms 162A by other suitable means. Base 162 also includes a retainer slot 162C in which at least a portion of key 166 is housed. Base 162 also includes a keying feature 162D that is configured to align with ferrule 154 when ferrule 154 is inserted into adapter 161 as discussed in greater detail herein.

Cap 164 includes a pair of apertures 164A that are configured to receive protrusions 162B of plurality of arms 162A to couple base 162 with cap 164. Cap 164 also includes a receiving slot 164C in which sleeve 156 is received. As shown, the receiving slot of cap 164 and the retainer slot of base 162 are diametrically opposed to each other. Like base 162, cap 164 also includes a keying feature 164B that is configured to align with ferrule 154 when ferrule 154 is inserted into adapter 161 as discussed in greater detail herein.

To assemble adapter 161, key 166 is inserted into retainer slot 162C of base 162, and sleeve 156 is inserted into the receiving slot 164C of cap 164. Then, base 162 and cap 164 are coupled to each other by inserting the corresponding protrusions 162B of the pair of arms 162A of base 162 into the pair of apertures 164A of cap 164.

Referring back to FIGS. 3-5, a spring push 158 of connector 152 is shown. Spring push 158 is configured to attach onto ferrule 154 on groove 160. In addition, spring push 158 is configured to receive biasing forces (in an axial direction (x-direction)) applied by spring 181 (as discussed below) and transfer the biasing forces onto ferrule 154. Spring push 158 comprises two halves 158A, 158B that define a passageway 163 through which optical fibers 125 or optical fiber ribbons 108 pass through. As shown, half 158A includes a protrusion 165 and an aperture 167, and half 158B includes a protrusion 165 and an aperture 167. Protrusion 165 of half 158A are configured to be inserted into aperture 167 of half 158B (and vice versa) to couple halves 158A, 158B to each other and form spring push 158.

With continued reference to FIGS. 3-5, as mentioned previously, connector assembly 150 includes spring 181, housing 168, and nut 185. Spring 181 is positioned adjacent spring push 158 and is retained in housing 168 and nut 185. Spring 181 is configured to bias ferrule 154 relative to nut 185. Spring 181 is also configured to apply a continuous axial force onto ferrule 154 to maintain axial alignment of mated connectors 150A, 150B. Such axial alignment is maintained through condition changes (e.g., temperature changes, etc.). As used herein, "axial alignment" refers to alignment of components along a longitudinal axis L of optical fibers 125 in a direction parallel to longitudinal axis L.

Housing 168 is installed on each end of connector assembly 150 between nut 185 and ferrule 154. Housing 168 is configured to house spring push 158 and spring 181. Housing 168 includes slots 168A, 168B that provide a routing path for nut 185 and internal keying features 168D to engage with keying features 162C, 164B of adapter 161 as discussed herein. Housing 168 also provides pre-alignment for sleeve 156 and key 166 for engaging ferrule 154 upon insertion of adapter 161 via engagement with adapter 161 as discussed in greater detail herein.

Figure 20:
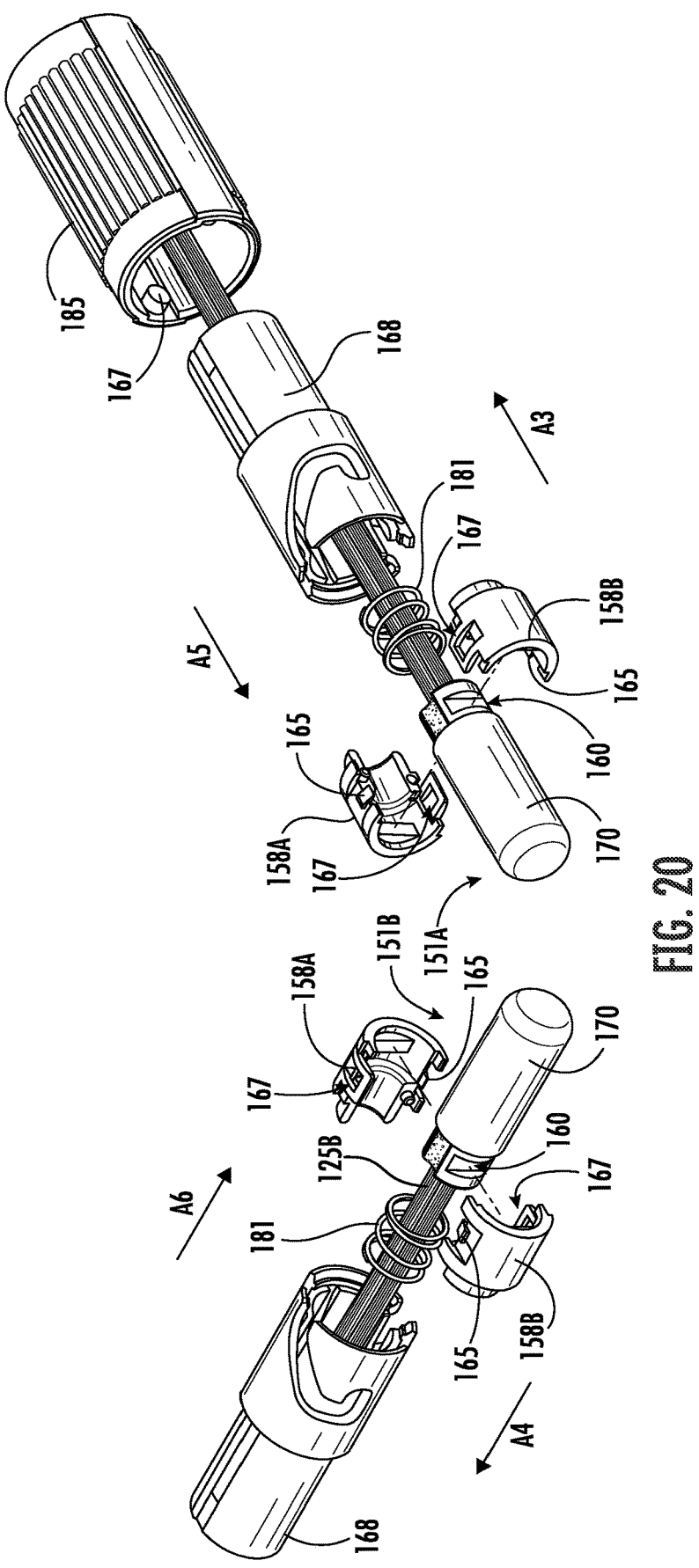

Nut 185 is coupled to spring 181, spring push 158, and housing 168. Nut 185 is configured to compress spring 181 as nut 185 is coupled to housing 168. In particular, as shown in FIG. 20, nut 185 includes cam pins 185A that are received in slots 168A, 168B of housing 168 as described above. Nut 185 is installed onto housing 168 via engagement of cam pins 185A within slots 168A, 168B, and such engagement applies an axial force onto connector assembly 150 to aid in securing mated connectors 150A, 1506 of connector assembly 150 as discussed below.

Figures 24A, 24B, 24C:
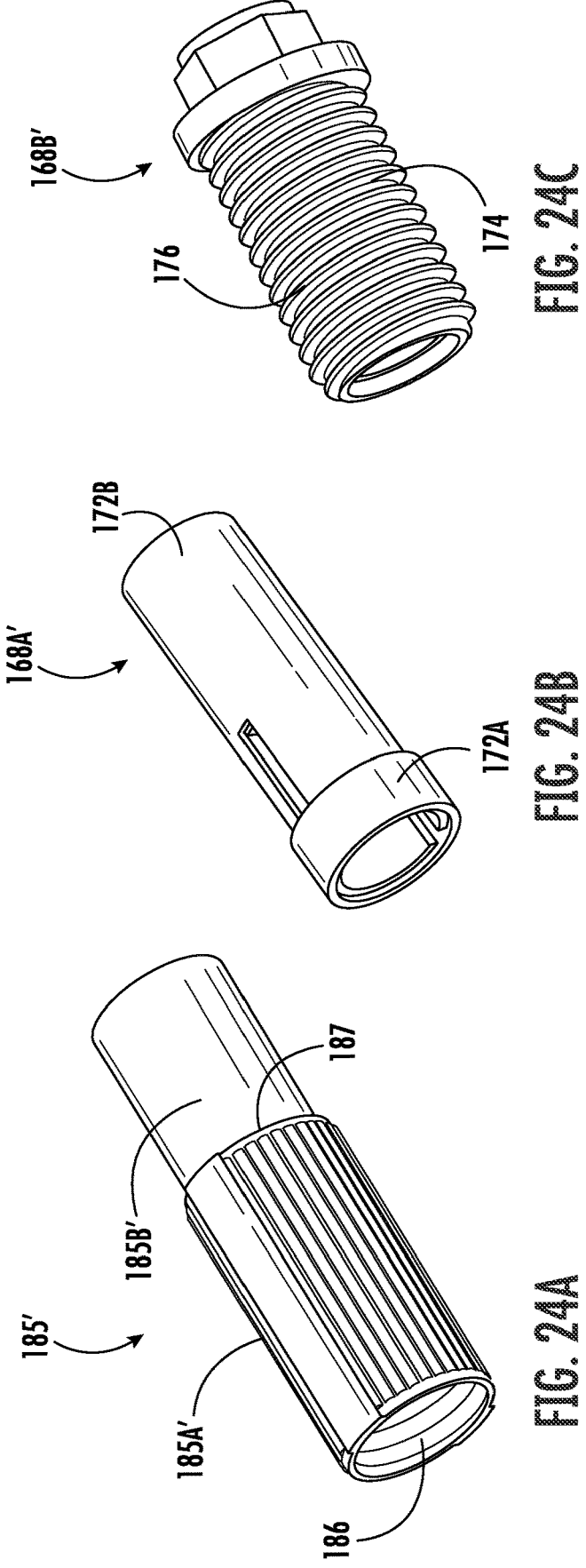
FIG. 24A is a perspective view of an alternate embodiment of a nut used in the connector of the present disclosure.
FIGS. 24B and 24C are perspective views of alternate embodiments of housings used in the connector of the present disclosure.

Referring briefly to FIGS. 24A-24C, in an alternate embodiment, housing 168 and nut 185 are replaced with a housing 168A', a housing 168B', and a nut 185'. As shown, housing 168A' includes a plurality of threads 176 on the outer surface 174 of housing 168A', and housing 168B' does not include such threading on the outer surface of housing 168B'. Nut 185' includes a plurality of internal threads 186 that are configured to engage with the plurality of threads 176 on housing 168A' during assembly of connector assembly 150. Additional structural detail of housing 168A', housing 168B' and nut 185' along with the corresponding method of assembly during assembly of connector assembly 150 is described in greater detail herein.

Figures 15, 16:
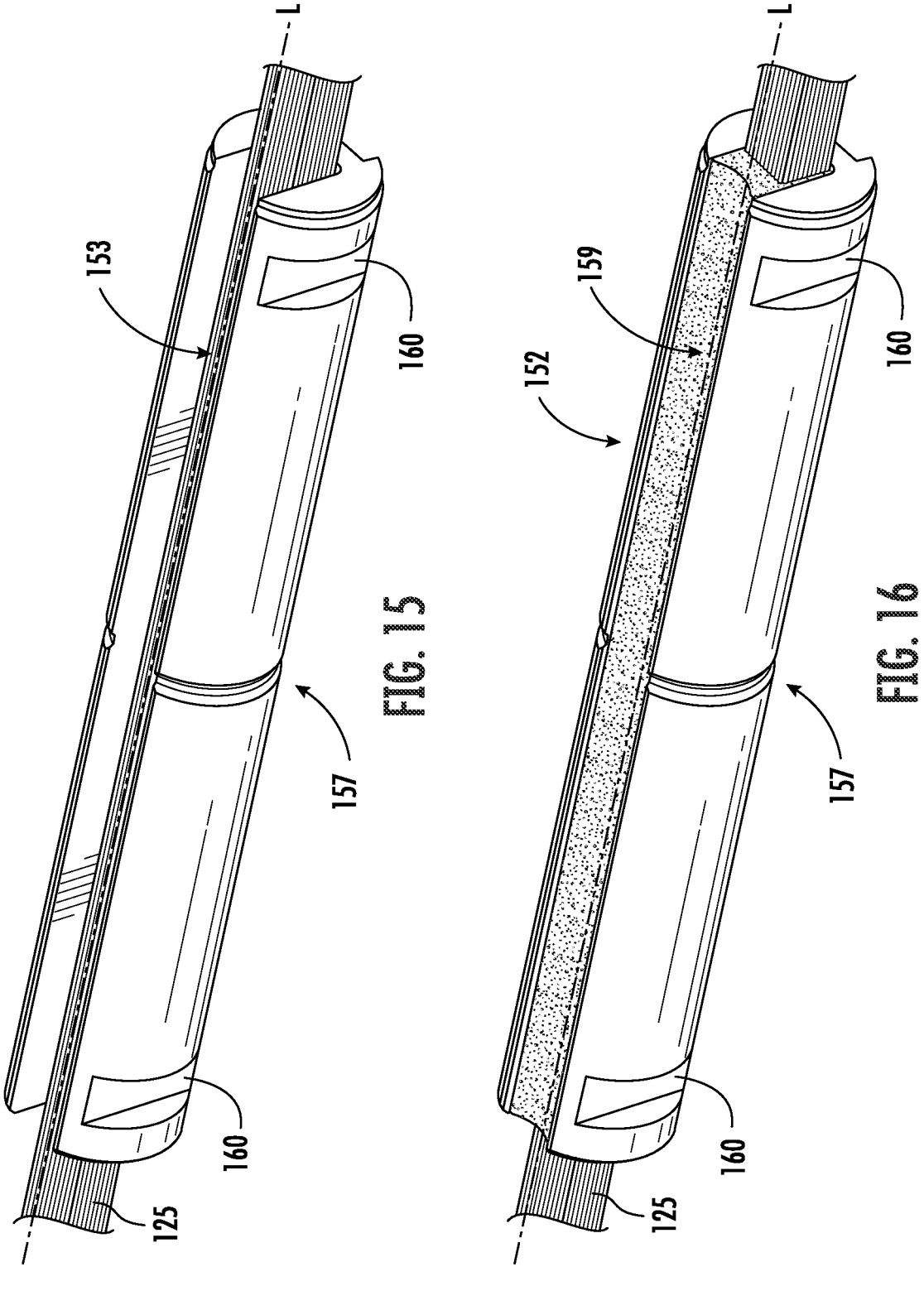
Figure 17:
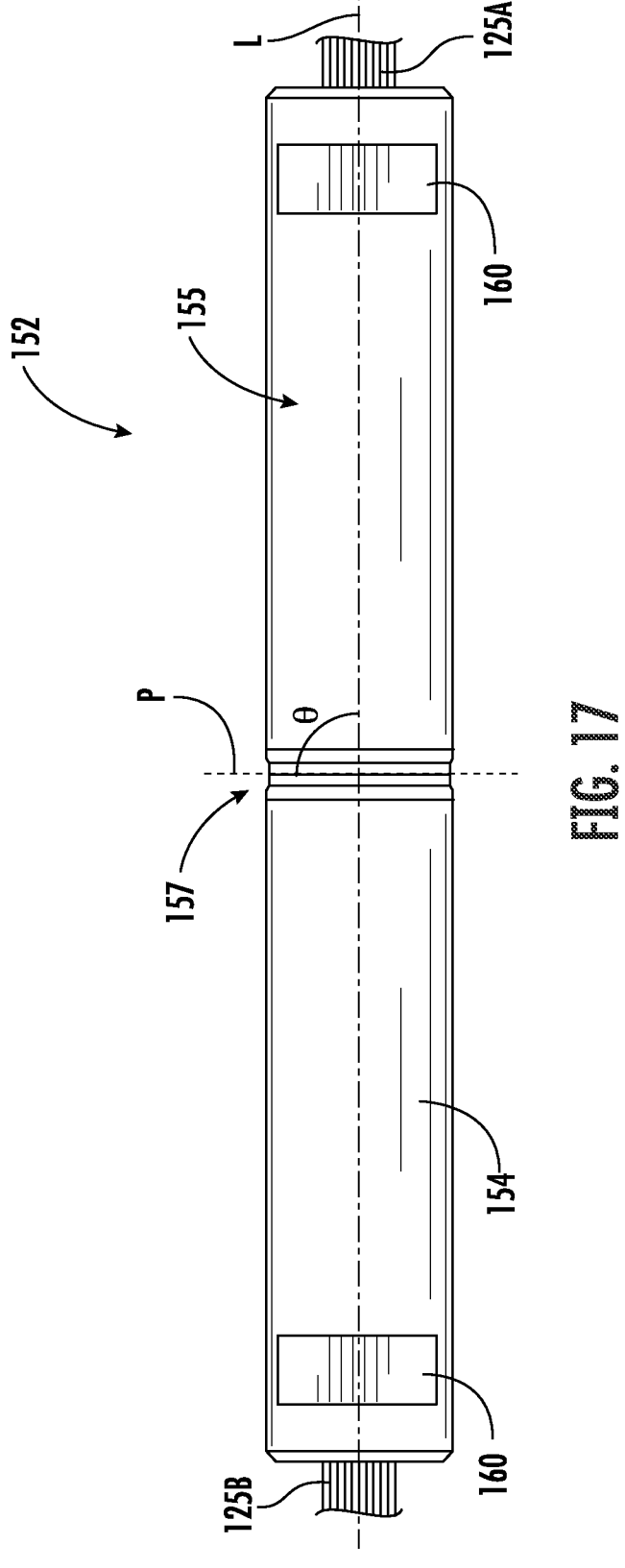

Referring now to FIGS. 15-23, a method of assembling connector 152 and connector assembly 150 is shown. Referring first to FIG. 15, optical fibers 125 are placed into ferrule 154 as shown. Then, as shown in FIG. 16, potting adhesive 159 is inserted into inner channel 153 of ferrule 154 to fill in the spaces between optical fibers 125 and to hold optical fibers 125 in place within ferrule 154 in an aligned position within connector 152 of connector assembly 150. In some embodiments, optical fibers 125 and potting adhesive 159 are inserted into inner channel 153 of ferrule 154 in an alternating layering pattern as discussed below. That is, a first layer of potting adhesive 159 is inserted into inner channel 153, and a first layer of optical fibers 125 is inserted on top of the first layer of the potting adhesive 159. This insertion sequence is continued until a final layer of potting adhesive 159 is inserted on top of the final layer of optical fibers 125. For example, for twelve optical fiber ribbons inserted into inner channel 153, there will be thirteen total layers of potting adhesive 159 where each layer of potting adhesive 159 is interspersed between each layer of optical fiber ribbon as discussed above. Potting adhesive 159 is then cured within ferrule 154.

Connector 152 is then diced along dicing plane P to form connector halves 152A, 152B (FIG. 18) and corresponding diced optical fibers 125A, 125B and diced connector ferrules 154A, 154B from connector assembly 150 as described above and shown in FIG. 17. In some embodiments, connector 152 is diced with a cutting tool (e.g., diamond wire dicing saw, etc.) to form connector halves 151A, 151B. Additional details relating to the performance of optical fibers 125 after dicing are disclosed in U.S. Patent Application No. 63/225,606, filed Jul. 26, 2021, the contents of which are incorporated by reference herein.

Referring now to FIG. 18, after dicing, connector halves 152A, 152B have corresponding end faces 179A, 179B that may require polishing depending on the quality of the cut performed along dicing plane P. In addition, an optional index matching layer may be applied onto end faces 179A, 179B. Details relating to the type of index matching layer and the application of index matching layer are disclosed in U.S. Patent Application No. 63/225,606, filed Jul. 26, 2021, the contents of which are incorporated by reference herein. In an alternate embodiment, an optional index matching layer may be applied onto end faces 179A, 179B after assembly of connector 152.

Figure 19:
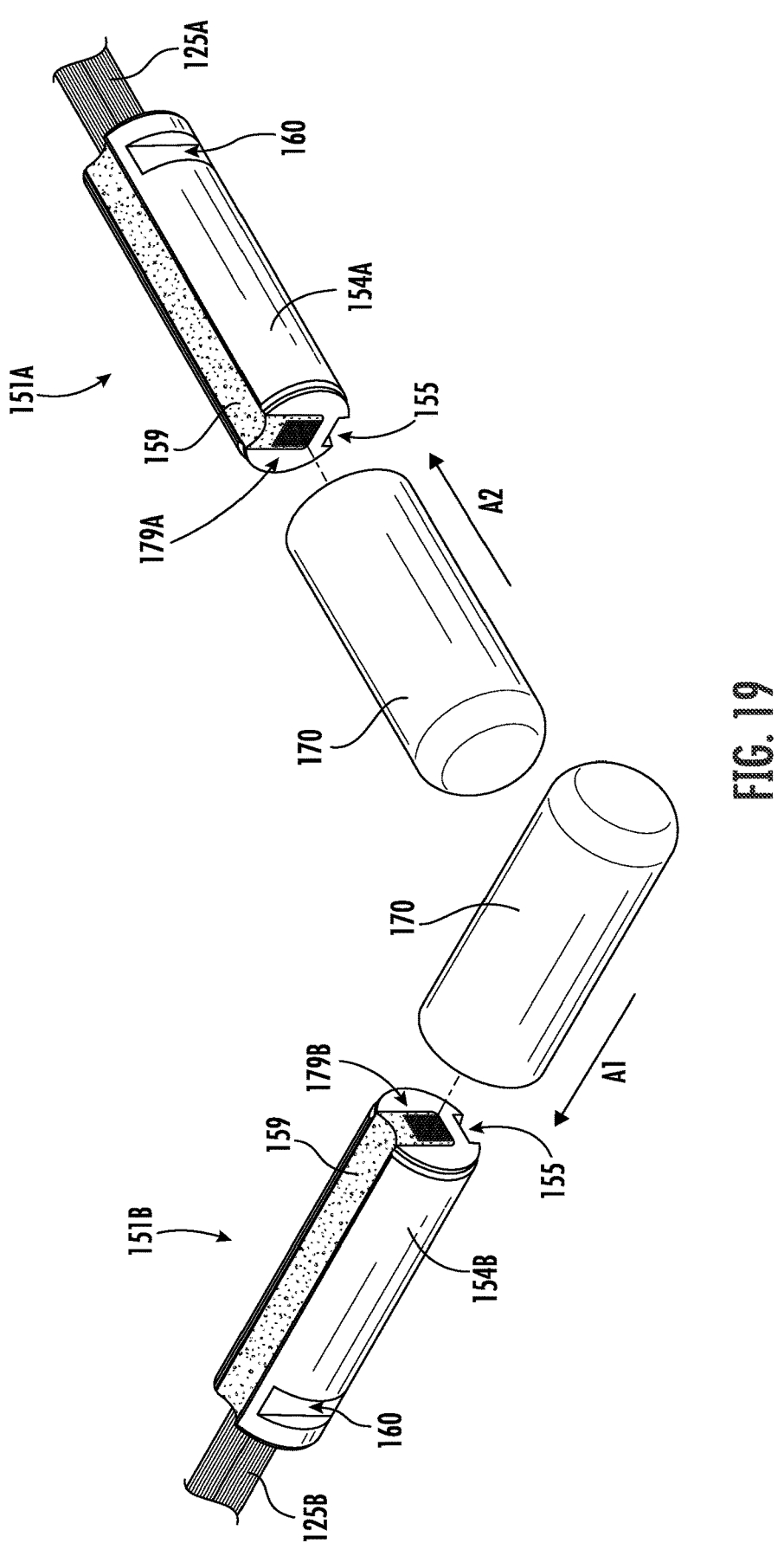

After optional polishing of end faces 179A, 179B and optional application of an index matching layer onto end faces 179A, 179B, dust caps 170 may be applied onto at least one of connector halves 151A, 151B as shown in FIG. 19 while connector halves 151A, 151B undergo further processing in the assembly of connector 152 and connector assembly 150. Dust caps 170 are applied onto connector halves 151A, 151B along directions A1, A2, respectively. Applying dust caps 170 onto connector halves 151A, 151B provides physical protection of ferrule 154 and housed optical fibers 108, 110 to prevent damage from external debris while applying other components of connector 152 and connector assembly 150 onto connector halves 151A, 151B as discussed below. For discussion purposes, dust cap 170 is applied onto both connector halves 151A, 151B. However, it is within the scope of the present disclosure that dust cap 170 can be applied onto one of connector halves 151A, 151B. While the disclosure and corresponding figures illustrate the use of a dust cap 170 during assembly of connector 152 and connector assembly 150, it is within the scope of the present disclosure that a dust cap 170 is not used during the assembly process described herein.

Figure 20A:
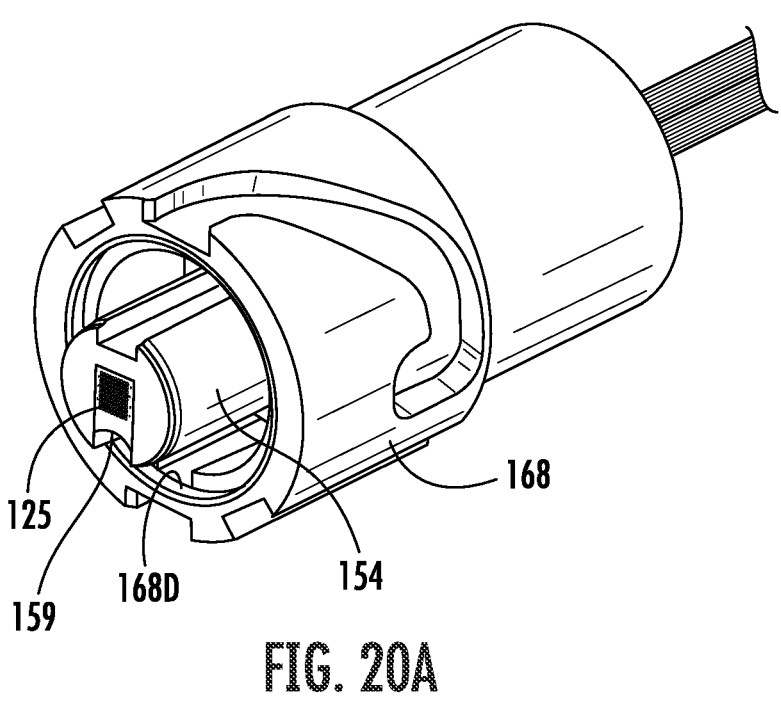
Figure 20B:
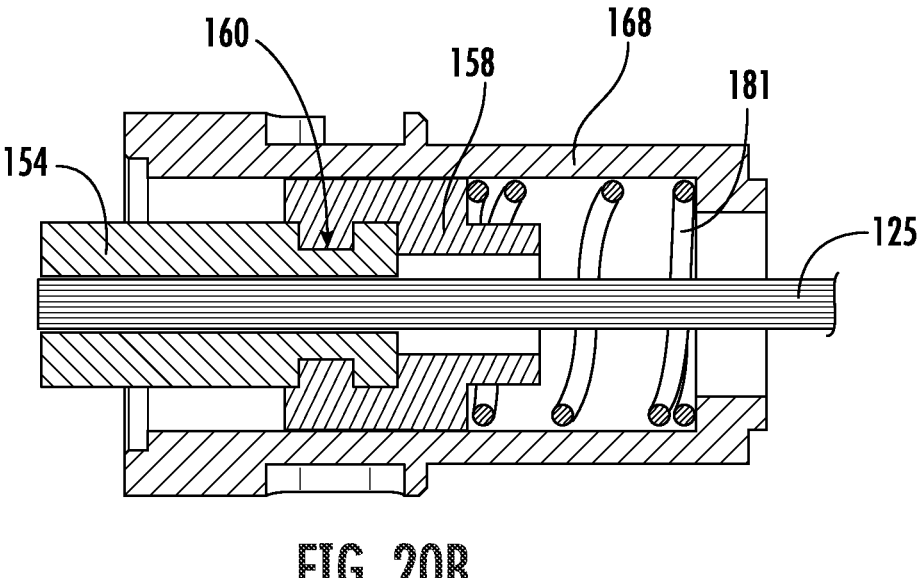

Referring now to FIGS. 20-20B, after connector halves 151A, 151B are placed in dust caps 170, various components of connector assembly 150 are applied onto connector halves 151A, 151B as discussed below. Beginning with connector half 151A, nut 185, housing 168, and spring 181 are moved along direction A3 and applied downstream of connector half 151A as shown. Referring now to connector half 151B, housing 168 and a spring 181 are moved along direction A4 and applied downstream of connector half 151B as shown. Then, corresponding spring push 158 are applied onto connector halves 151A, 151B. In particular, as shown in FIGS. 20A and 20B, spring push 158 are applied onto grooves 160 of ferrules 154A, 154B, and spring 181 is seated onto spring push 158 with housing 168 housing at least a portion of ferrule 154, spring push 158, and spring 181. As used herein, "downstream" refers to a position distal from ferrule 154 of connector halves 151A, 151B and along respective diced optical fibers 125A, 125B.

After installation of the components downstream of connectors 150A, 150B, housing 168 and spring 181 are advanced along directions A5, A6 respectively, such that ferrule 154, spring push 158, and spring 181 are at least partially housed within housing 168 as shown in FIGS. 20A and 20B.

After this step, as shown in FIGS. 21A-C, adapter 161 is assembled. As shown, key 166 is coupled to base 162 via a corresponding retainer slot 162C, and sleeve 156 is coupled to cap 164 via a corresponding receiving slot 164C. Base 162 (with key 166) and cap 164 (with sleeve 156) are coupled to each other by engaging arms 162A of base 162 with cap 164 such that protrusions 162B of arms 162A extend into corresponding apertures 164A of cap 164 to couple base 162 to cap 164. When base 162 and cap 164 are coupled together, sleeve 156 and key 166 are held in place within adapter 161. It is within the present disclosure that in some embodiments, adapter 161 is pre-assembled and the foregoing assembly process is not needed.

Referring now to FIG. 22A, adapter 161 is then placed in between connector halves 151A, 151B as shown, and connectors 150A, 150B are moved along directions A7, A8, respectively to engage ferrules 154A, 154B with adapter 161 and form connector 152 within housings 168. In particular, ferrule 154 of connector half 151A engages with base 162, and ferrule 154 of connector half 151B engages with cap 164. Both base 162 and cap 164 have internal keying features 162D, 164D, respectively, such that ferrules 154A, 154B engage with the respective internal keying features 162D, 164D and fit in the proper orientation within adapter 161 whereby, ferrules 154A, 154B are aligned with each other. Stated another way, the internal keying features 162D, 164D enable sleeve 156 and key 166 to engage with ferrules 154A, 154B and maintain the alignment between ferrules 154A, 154B as discussed previously.

In addition, base 162 and cap 164 have external keying features 162C, 164B, respectively, that are configured to fit within keying features of housing 168 when assembling connector assembly 150. For example, as shown in FIG. 22B, the keying features 162C, 164B of base 162 and cap 164, respectively, align with and engage with a corresponding internal keying feature 168D (FIG. 20A) of housing 168 such that housings 168 of connector halves 151A, 151B are in alignment and in the proper orientation with respect to adapter 161. In particular, housings 168 of connectors 150A, 150B are rotated about the longitudinal axis L of the optical fibers in the direction of R1, R2, respectively, such the internal keying feature 168D of housing 168 align with keying features 162C, 164B of base 162 and cap 164, respectively. In this way, key 166 and sleeve 156 are aligned with ferrules 154A, 154B for engagement when assembling connector assembly 150. Housings 168 are then advanced towards each other (in the direction of A7, A8; FIG. 22A) such that ferrules 154A, 154B are inserted into sleeve 156 and key 166 is engaged within keyway 155 of ferrules 154A, 154B as described above.

Figures 23A, 23B, 23C, 23D, 23E, 23F:
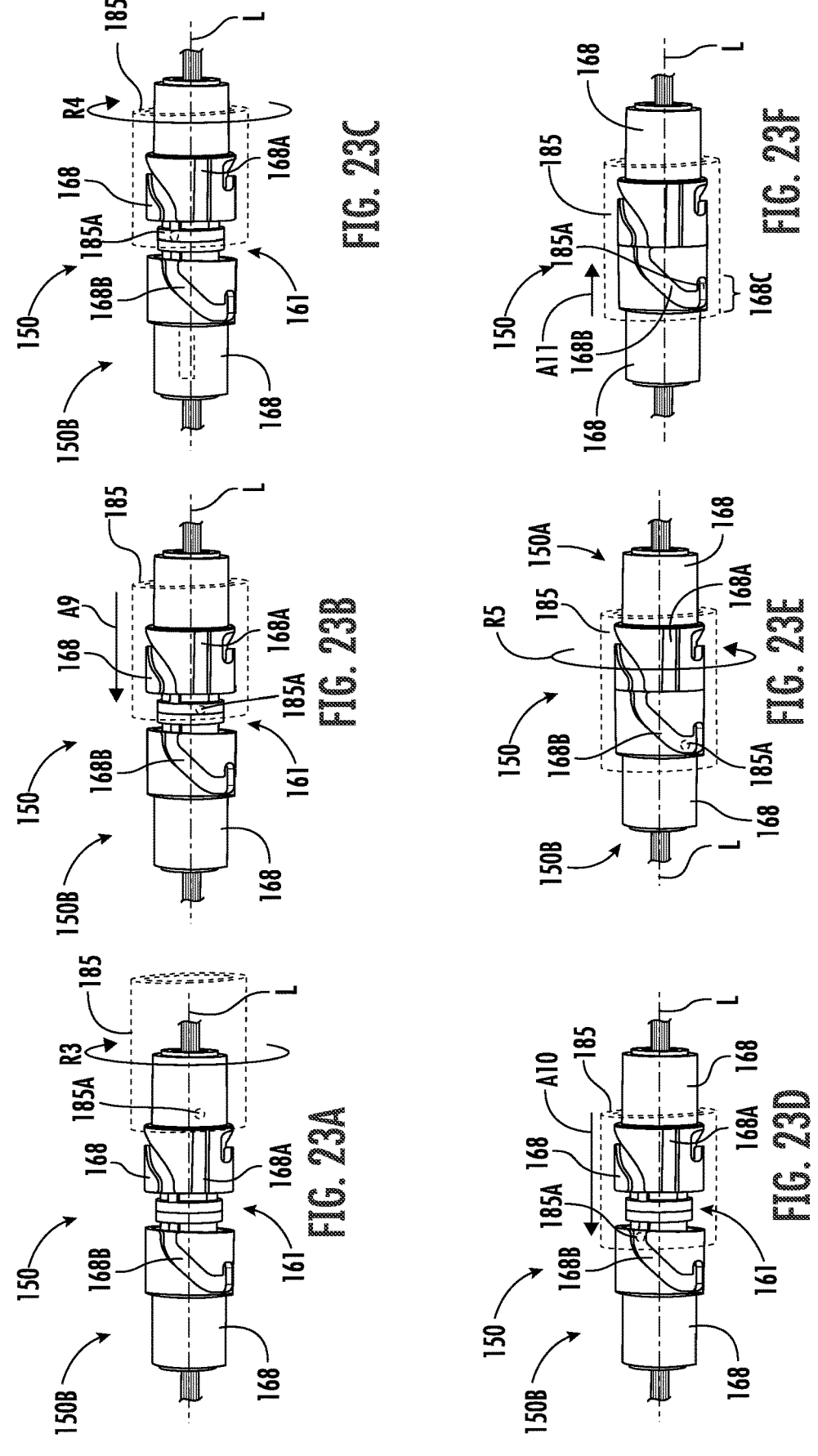

Referring now to FIGS. 23A-F, nut 185 is installed onto connector halves 151A, 151B to form connector assembly 150 as discussed herein. In particular, referring first to FIG. 23A, nut 185 is rotated about longitudinal axis L along direction R3 until cam pins 185A are aligned with clearance slot 168A. Then, as shown in FIG. 23B, cam pin 185A is advanced through clearance slot 168A in direction A9 until cam pin 185A is above adapter 161. Referring now to FIG. 23C, nut 185 is then rotated about longitudinal axis L along direction R4 until cam pin 185A is aligned with cam slot 168B of housing 168 on connector half 151B. Then, as shown in FIG. 23D, compression nut 185 is advanced in direction A10 such that cam pin 185A enters cam slot 168B. Cam pin 185A is then advanced through cam slot 168B by rotating compression nut 185 about longitudinal axis L along direction R5, and this rotation pulls housings 168 of connectors 150A, 150B together as shown in FIG. 23E. Finally, as shown in FIG. 23F, to retain the configuration of connector assembly 150 of FIG. 23E, cam pin 185A of compression nut 185 is moved along direction A11 such that cam pin 185A engages with retention slot 168C, which is a portion of cam slot 168B configured to retain cam pin 185A to retain the assembled configuration of connector assembly 150.

Figures 25A, 25B:
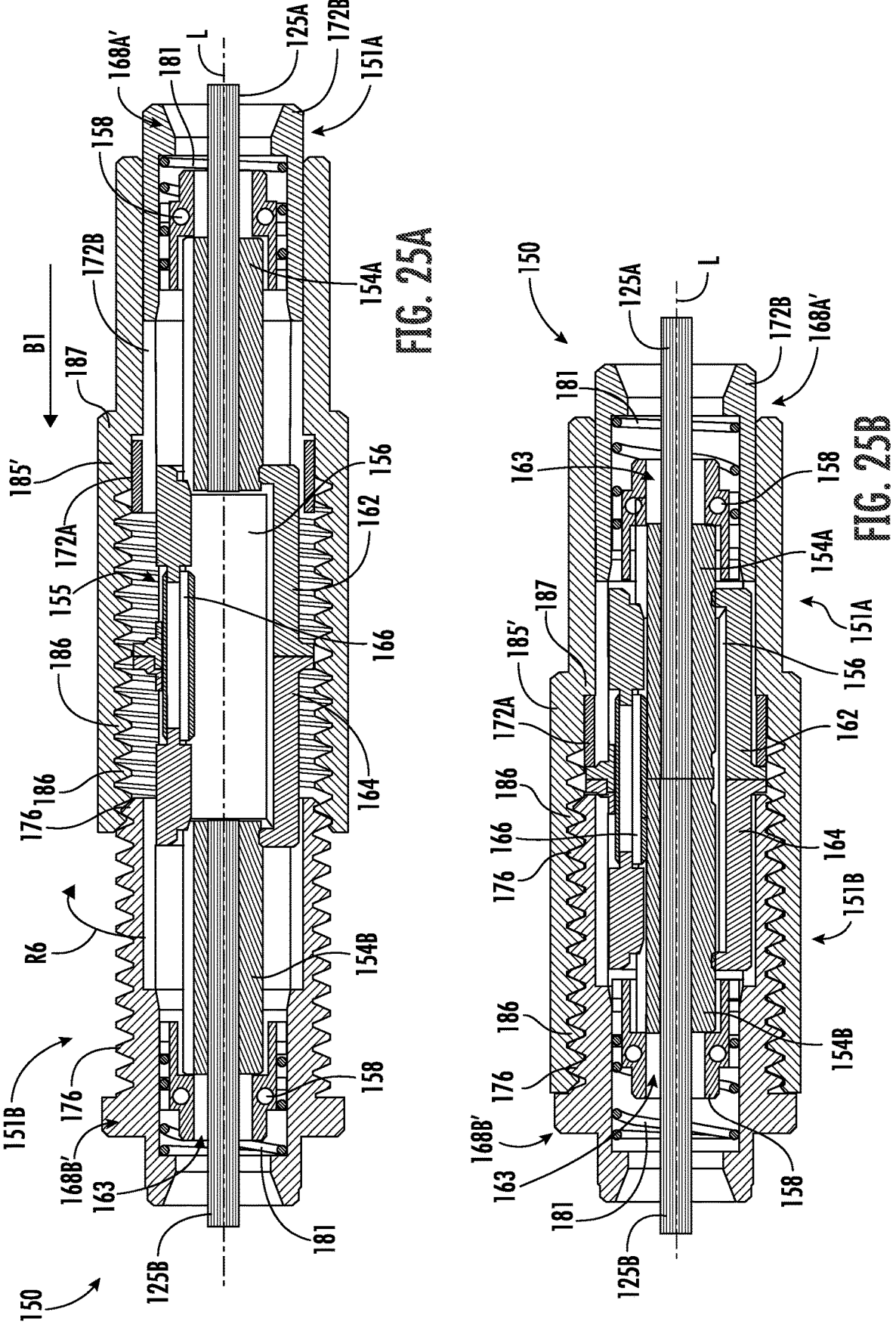
FIGS. 25A and 25B are cross sectional views of an alternate embodiment of the connector of the present disclosure illustrating use of the alternate embodiments of the nut and housings of FIGS. 24B and 24C, respectively.

Referring now to FIGS. 24A-24C, alternate embodiments of compression nut 185 and housing 168 is shown as mentioned above. Referring first to FIG. 24A, compression nut 185' is shown. Compression nut 185' has a head portion 185A' and a tail portion 185B'. Referring briefly to FIGS. 25A and 25B, tail portion 185B' has a smaller diameter than head portion 185A', and the head and tail portions 185A', 185B' are integrally formed with each other to form a ledge 187 that is configured to engage with a head portion 172A of housing 168A' (FIG. 24B) as discussed herein. Compression nut 185' also has internal threads 186 that are configured to engage with threads of housing 168B' (FIG. 24B) as discussed in greater detail herein.

Referring now to FIG. 24B, a housing 168A' is shown. Housing 168A' includes a head portion 172A and a tail portion 172B where the tail portion 172B is configured to provide a surface upon which tail portion 185B' of compression nut 185' can rest.

Referring now to FIG. 24C, a housing 168B' is shown. Housing 168B' in conjunction with housing 168A' is configured to house connector 152. In addition, housing 168B' has a surface 174 comprising threads 176 that are configured to engage with the internal threads 186 of compression nut 185' during assembly of connector assembly 150. As shown, internal threads 186 extend circumferentially around surface 174 of housing 168B'.

Referring now to FIGS. 25A and 25B, a method of assembling connector assembly 150 with housings 168A', 168B' and compression nut 185' is shown. In this alternate embodiment, after housings 168A', 168B' are advanced upstream to house at least a portion of spring 181, spring push 158, and ferrule 154, compression nut 185' is moved along direction B1 until at least one internal thread 186 of compression nut 185 engages with at least one thread 176 of housing 168A'. Then, as shown, compression nut 185' continues to advance in direction B1 until the ledge 187 of compression nut 185' engages with the head portion 172A of housing 168A'. In particular, to advance compression nut 185' along direction B1, compression nut 185' is rotated about longitudinal axis L along direction R6 to advance internal threads 186 along threads 176 of housing 168B' whereby compression nut 185' and housing 168B' are in threaded engagement with each other. This screwing type mechanism between compression nut 185' and threads 176 of housing 168B' moves connector 150A and adapter 161 into housing 168B' such that springs 181 are compressed and connectors 150A, 150B are housed within housings 168A', 168B' and compression nut 185' to form connector assembly 150.

An advantage of the above-mentioned methods is that assembly of connector assembly 150 can be completed mechanically by a technician without the use of specific tools while still creating the requisite interference fits and force distribution to provide proper sealing and maintain alignment of connector assembly 150. This simplifies the assembly process.

While the present disclosure above is directed to optical fibers 125 in accordance with the provided definition, it is within the scope of the present disclosure that connector assembly 150 may be used in alternate fiber optic applications in which optical fibers 125 comprise a fusion spliced optical fiber. In this embodiment, fusion splicing of optical fibers 125 is completed prior to installation within connector assembly 150 as discussed in U.S. Patent Application No. 63/225,606, filed Jul. 26, 2021, the disclosure of which is hereby incorporated by reference in its entirety.

Persons skilled in optical connectivity will appreciate additional variations and modifications of the elements disclosed herein. Such persons will also appreciate variations and modifications of the methods involving the elements disclosed herein. For example, although embodiments are described above where less than all of the bonding agent is melted and solidified when forming a fiber optic connector sub-assembly, in alternative embodiments all or substantially all of the bonding agent may be melted and solidified. In addition, skilled persons will appreciate alternatives where some of the steps described above are performed in different orders. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. An optical fiber connector assembly comprising:
a plurality of optical fibers;
a connector including:
a ferrule having an inner channel in which the plurality of optical fibers are secured, the inner channel extending to an outer surface of the ferrule, the ferrule having at least one keyway on the outer surface of the ferrule and along at least a portion of a length of the ferrule, wherein the keyway extends away from the inner channel;
a key received in the at least one keyway, wherein the key engages with an inner wall of the at least one keyway to limit rotational movement of the connector assembly; and
a sleeve that covers the inner channel of the ferrule and does not cover the keyway of the ferrule.

2. The optical fiber connector assembly of claim 1, wherein the ferrule includes a groove, wherein the sleeve spans at least the groove of the ferrule.

3. The optical fiber connector assembly of claim 1, wherein the keyway has an opening that is opposite of an opening of the inner channel of the ferrule.

4. The optical fiber connector assembly of claim 1, wherein the key comprises a U shaped key, wherein the U shaped key has a height H and a width W, wherein the height H is greater than the width W.

5. The optical fiber connector assembly of claim 4, wherein a ratio of height H to width W ranges between 0.5:1 and 4:1.

6. The optical fiber connector assembly of claim 1, wherein the key comprises a key body defined by at least a straight portion of the key, wherein the straight portion engages with edges of the keyway.

7. The optical fiber connector assembly of claim 6, wherein the key body includes an opening defined by the straight portion and an angled portion of the key.

8. The optical fiber connector assembly of claim 6, wherein the key body is further defined by an angled portion of the key, the key body further including a plurality of slots within the key body.

9. The optical fiber connector assembly of claim 8, wherein the plurality of slots comprises at least one slot spanning a portion of the straight portion and a portion of the angled portion of the key.

10. An optical fiber connector assembly comprising:
a plurality of optical fibers;
a connector including:
a ferrule having an inner channel in which the plurality of optical fibers are secured, the ferrule having at least one keyway on an outer surface of the ferrule and along at least a portion of a length of the ferrule, the ferrule also having a groove;
a key received in the at least one keyway, wherein the key engages with an inner wall of the at least one keyway to limit rotational movement of the connector assembly; and
a sleeve applied onto the ferrule, wherein the sleeve covers at least the inner channel of the ferrule and spans the groove of the ferrule; and
an adapter comprising:
a cap including configured to house the sleeve; and
a base coupled to the cap, the base configured to retain the key to be inserted into the keyway of the ferrule;
a first cam that houses a first spring and a second cam housing a second spring, wherein the first spring and the second spring are operably coupled to the ferrule such that the first spring and the second spring apply biasing forces onto the ferrule in opposite directions.

11. The optical fiber connector assembly of claim 10, further comprising a first spring push and a second spring push coupled to the ferrule, wherein the first spring push and the second spring push are positioned respectively between the first spring and the ferrule and the second spring and the ferrule, and wherein the first spring push and the second spring push are configured to receive and transfer the respective biasing forces applied by the first spring and the second spring onto the ferrule.

12. The optical fiber connector assembly of claim 10, further comprising a nut coupled to the cam, wherein the cam includes a cam slot and the nut includes corresponding cam pins configured to be received into the nut slot.

13. The optical fiber connector assembly of claim 10, further comprising a nut coupled to the cam, wherein at least a portion of the cam and at least a portion of the nut are threaded such that the nut and the cam are in threaded engagement with each other.

14. The optical fiber connector assembly of claim 10, wherein the key comprises a split sleeve key, wherein the split sleeve key includes a slit parallel to a longitudinal axis of the ferrule.

15. The optical fiber connector assembly of claim 10, wherein the key comprises a U shaped key, wherein the U shaped key has a height H and a width W, wherein a ratio of height H to width W ranges between 0.5:1 and 4:1.

16. The optical fiber connector assembly of claim 10, wherein the key comprises a key body defined by a straight portion and an angled portion of the key such that the key includes an opening defined by the straight portion and an angled portion of the key, wherein the straight portion engages with edges of the keyway.

17. The optical fiber connector assembly of claim 10, wherein the key comprises a key body defined by a straight portion and an angled portion of the key;
wherein the straight portion engages with edges of the keyway;
wherein the key body further includes a plurality of slots within the key body; and
wherein the plurality of slots comprises at least one slot spanning a portion of the straight portion and a portion of the angled portion of the key.

18. A method of assembling a connector assembly comprising:
inserting a plurality of optical fibers into an inner channel of a ferrule, the ferrule having an inner channel in which the plurality of optical fibers are secured, the inner channel extending to an outer surface of the ferrule, the ferrule having a keyway on the outer surface of the ferrule and along at least a portion of a length of the ferrule, wherein the keyway extends away from the inner channel;
inserting an adhesive into the inner channel;
dicing the ferrule along a dicing plane at a dicing groove to form a first connector half and a second connector half, wherein the dicing plane has an angle θ relative to a longitudinal axis of the ferrule;
preparing an adapter comprising a base coupled to a cap, wherein a key is coupled to the base and a sleeve is coupled to the cap;
inserting the first connector half into the base of the adapter and into the sleeve and the key of the adapter;
inserting the second connector half into the cap of the adapter and into the sleeve and the key of the adapter;

19

20 wherein the sleeve covers the inner channel and the key is inserted into the keyway of the first and second connector halves, wherein the sleeve does not cover the keyway of the ferrule; and wherein the sleeve and the key span the dicing groove of the ferrule.

19. The method of claim 18, further comprising:

applying a nut downstream of the first connector half or the second connector half;

applying a first housing downstream of the first connector half and a second housing downstream of the second connector half.

20. The method of claim 19, further comprising:

installing a spring push onto either side of the ferrule;

retaining a spring within the first housing and the second housing, wherein the spring is configured to bias the first connector half and the second connector half in opposite directions relative to each other;

wherein the spring is received on the spring push that contacts the first connector half or the second connector half to transfer the biasing force to the connector assembly.

21. The method of claim 18, wherein the angle θ ranges between 82° and 90°.

\* \* \* \* \*